United States Patent
Kondo et al.

(10) Patent No.: US 7,424,130 B2
(45) Date of Patent: *Sep. 9, 2008

(54) CODING APPARATUS AND METHOD, DECODING APPARATUS AND METHOD, DATA PROCESSING SYSTEM, STORAGE MEDIUM, AND SIGNAL

(75) Inventors: Tetsujiro Kondo, Tokyo (JP); Yoshinori Watanabe, Kanagawa (JP); Kenji Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 10/935,792

(22) Filed: Sep. 7, 2004

(65) Prior Publication Data

US 2005/0031161 A1    Feb. 10, 2005

Related U.S. Application Data

(63) Continuation of application No. 09/413,134, filed on Oct. 6, 1999, now Pat. No. 6,804,372.

(30) Foreign Application Priority Data

| Oct. 7, 1998 | (JP) | ................................. 10-285308 |
| Oct. 5, 1999 | (JP) | ................................. 11-284200 |

(51) Int. Cl.
 *G06K 9/00* (2006.01)
 *H04N 1/46* (2006.01)
 *G06K 9/36* (2006.01)

(52) U.S. Cl. ........................ 382/100; 358/539; 382/232

(58) Field of Classification Search ................. 382/100, 382/232–240, 243–248; 380/51, 54, 201, 380/210, 252, 287, 217, 269; 713/176, 179; 348/461, 463, 14.13, 568; 370/522–529; 386/94; 725/9, 20, 22; 283/72, 74–81, 85, 283/93, 113, 901, 902; 358/3.28, 539; 704/500, 704/503; 712/208–213

See application file for complete search history.

(56) References Cited

U.S. PATENT DOCUMENTS

| 4,663,659 | A | | 5/1987 | Blatter |
| 5,077,794 | A | | 12/1991 | Taylor |
| 5,144,663 | A | | 9/1992 | Kudelski et al. |
| 5,708,853 | A | | 1/1998 | Sanemitsu |
| 5,721,788 | A | * | 2/1998 | Powell et al. ................ 382/100 |
| 5,727,092 | A | | 3/1998 | Sandford, II et al. |
| 5,751,809 | A | * | 5/1998 | Davis et al. .................. 713/176 |
| 5,778,102 | A | | 7/1998 | Sandford, II et al. |
| 5,801,919 | A | | 9/1998 | Griencewic |
| 5,819,289 | A | * | 10/1998 | Sanford et al. ............ 707/104.1 |
| 5,850,482 | A | * | 12/1998 | Meany et al. ................ 382/232 |
| 5,875,249 | A | * | 2/1999 | Mintzer et al. ................ 380/54 |
| 5,880,928 | A | | 3/1999 | Ma |
| 5,946,414 | A | | 8/1999 | Cass et al. |
| 6,005,643 | A | | 12/1999 | Morimoto et al. |
| 6,005,936 | A | | 12/1999 | Shimizu et al. |
| 6,055,321 | A | | 4/2000 | Numao et al. |
| 6,122,403 | A | * | 9/2000 | Rhoads ........................ 382/233 |
| 6,148,333 | A | | 11/2000 | Guedalia et al. |

FOREIGN PATENT DOCUMENTS

| DE | 298 14 998 | 12/1997 |
| EP | 0 762 764 | 3/1997 |
| EP | 0 802 475 | 10/1997 |
| EP | 0 838 785 | 4/1998 |
| EP | 0845 757 | 6/1998 |
| EP | 0859 337 | 8/1998 |
| FR | 2 631 192 | 11/1989 |
| JP | 2 266390 | 10/1990 |
| JP | 9 154007 | 6/1997 |

IMAGE TRANSMISSION SYSTEM

| | | |
|---|---|---|
| JP | 9 179494 | 7/1997 |
| JP | 2000 31831 | 1/2000 |
| WO | WO 97 44757 | 11/1997 |
| WO | WO 99 10837 | 3/1999 |

OTHER PUBLICATIONS

Maxwell T. Sandford II "The data embedding method" Proc. SPIE vol. 2615: Integration Issues in Large Commercial Media Delivery System, Jan. 1996, pp. 226-259.*

Anon.: "Camera Tilt Mechanism" IBM Technical Disclosure Bulletin, vol. 39, No. 4, Apr. 1996, pp. 311-313, XP000587510.

Nikolaidis N. et al.: "Robust Image Watermarking in the Spatial Domain" Signal Processing European Journal Devoted to the Methods and Applications of Signal Processing, vol. 66, No. 3, May 28, 1998, pp. 385-403, XP004124959.

Swanson M D et al.: "Multiresolution Scene-Based Video Watermarking Using Perceptual Models" IEEE Journal on Selected Areas in Communications, IEEE Inc., New York, U.S., vol. 16, No. 4, May 1, 1998, pp. 540-550, XP000765114SSN: 0733-8716.

Swanson M D et al.: Multiresolution Video Watermarking Using Perceptual Models and Scene Segmentation: Proceedings of the International Conference on Image Processing, U.S., Los Alamitos, CA: IEEE Computer Society, Oct. 1997 U.S., pp. 558-561, XP000669444 IBSN: 0-8186-8184-5.

Swanson M D et al.: "Robust Audio Watermarking Using Perceptual Masking" Signal Processing, European Journal Devoted to the Methods and Applications of Signal Processing, Elsevier Science Publishers, B. V. Amsterdam, NL, vol. 66, No. 3, May 28, 1998, pp. 337-335, XP004124956, ISSN:0165-1684.

Boney L., Tewfik A., Hamdy K.: "Digital Watermarks for Audio Signals" Multimedia Computing and Systems, 1996, Processings of the Third IEEE International Conference, Jun. 17-23, 1996, pp. 473-480, XP002160496.

* cited by examiner

*Primary Examiner*—Abolfazl Tabatabai
(74) *Attorney, Agent, or Firm*—Frommer Lawrence & Haug LLP; William S. Frommer; Thomas F. Presson

(57) ABSTRACT

The invention relates to a coding apparatus for embedding second data into first data without deteriorating the first data and a decoding apparatus for decoding coded data into original first data and second data without deteriorating those data. The invention provides a coding apparatus which has a memory for storing at least partial data of first data, and embeds second data into the first data by rearranging, according to the second data, the at least partial data of the first data that is stored in the memory. The invention also provides a coding apparatus for decoding coded data in which second data is embedded and at least partial data of the coded data has been subjected to rearrangement by using one of a plurality of rearrangement patterns. The decoding apparatus calculates correlation between adjacent data for each rearrangement pattern, and decodes the original first data and the second data according to a rearrangement pattern that is determined based on the correlation.

7 Claims, 24 Drawing Sheets

EMBEDDED CODING/DECODING

UTILIZATION OF CONTINUITY

UTILIZATION OF SIMILARITY

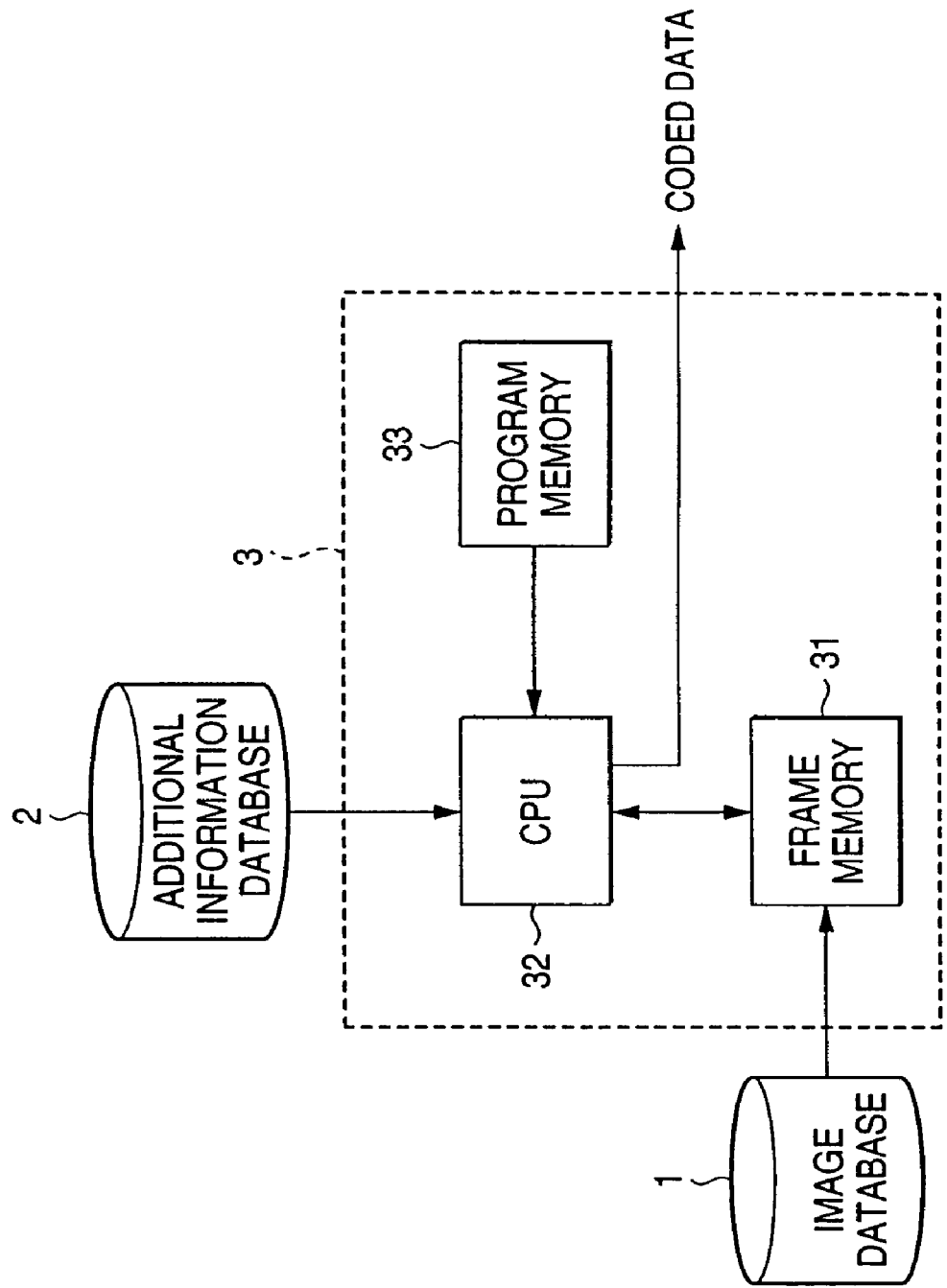

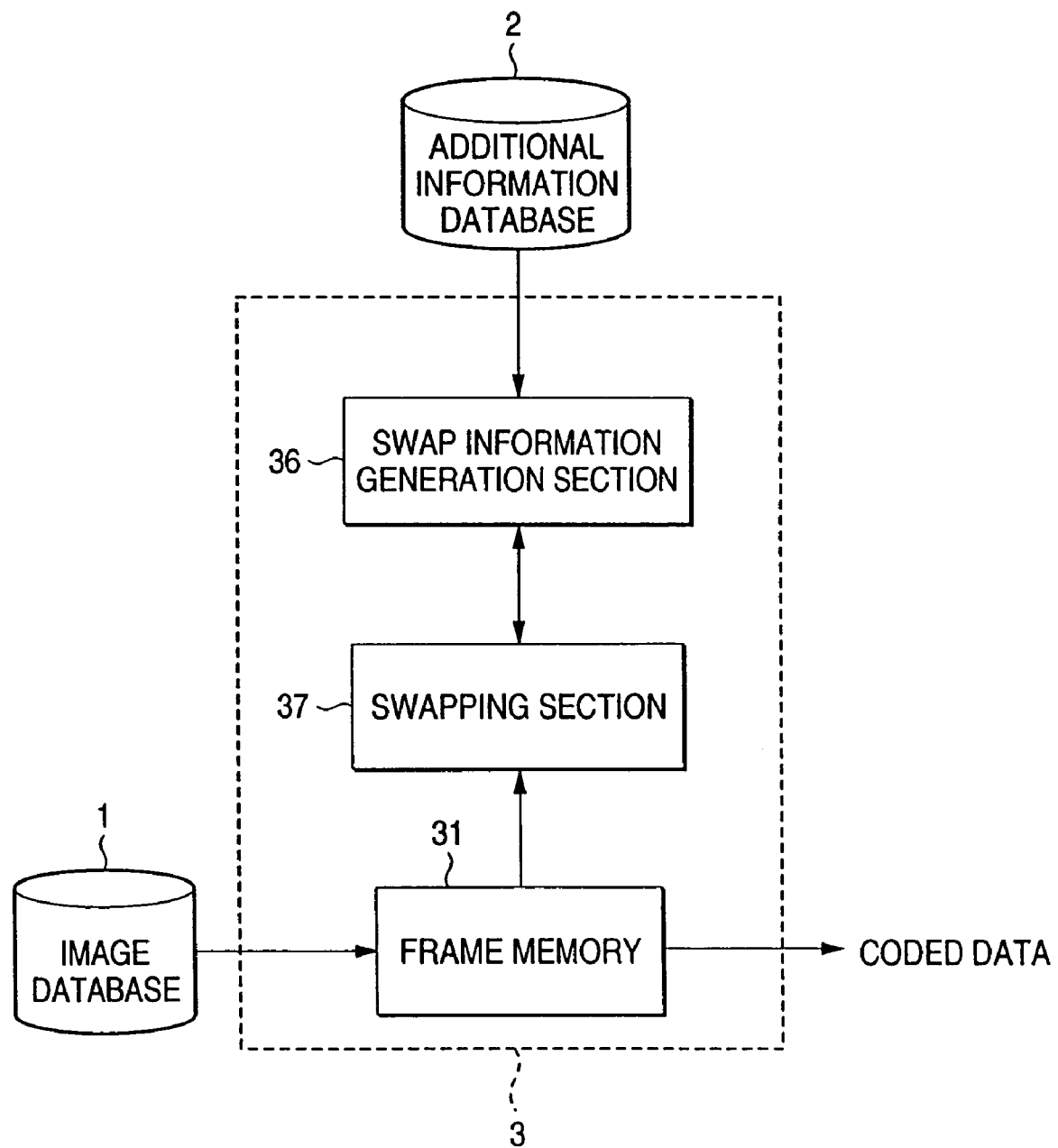

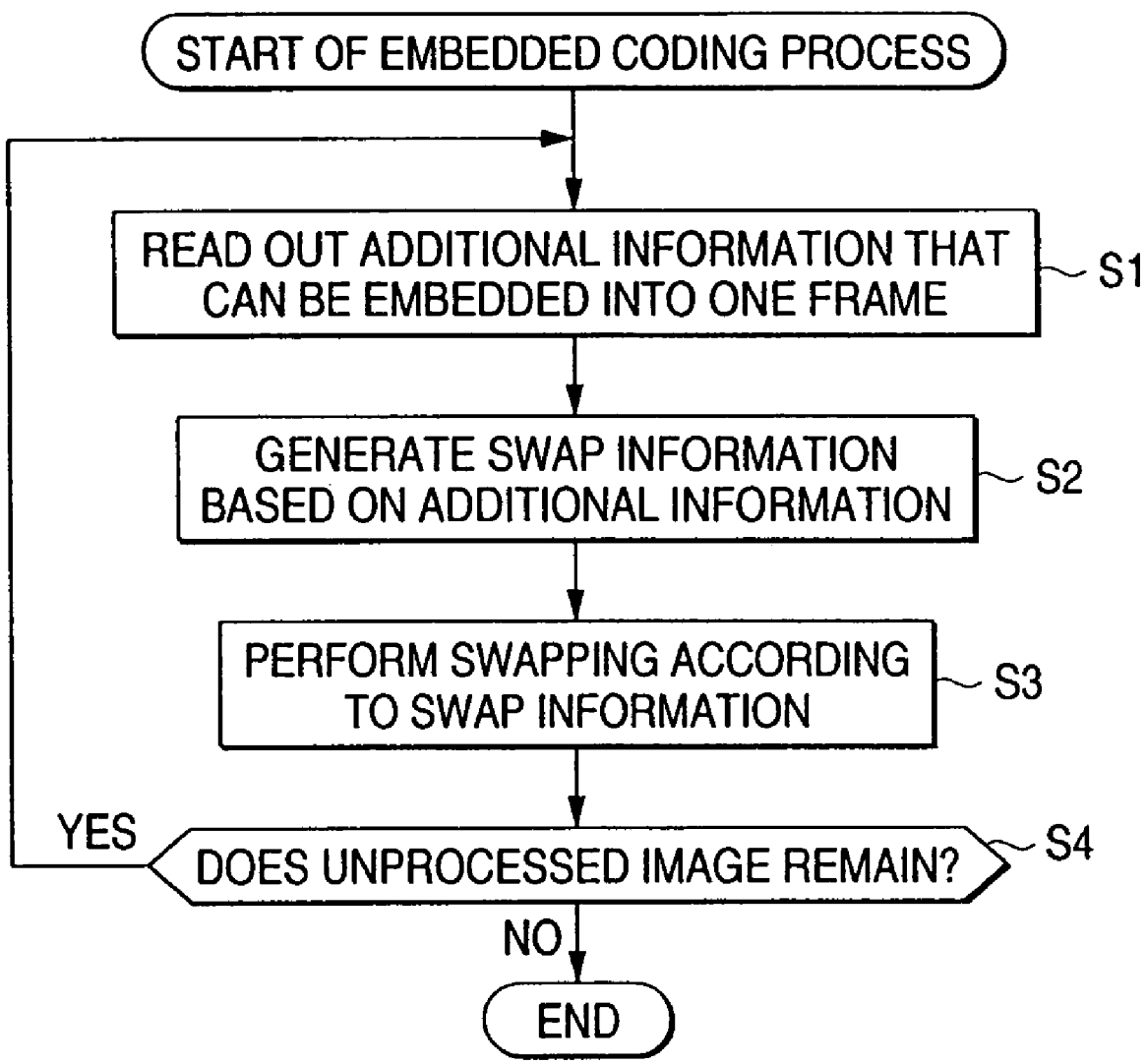

FIG. 19

| (1, 1) | (1, 2) | (1, 3) | (1, 4) | (1, 5) | (1, 6) | | PIXEL (1, N) |
|---|---|---|---|---|---|---|---|
| (2, 1) | (2, 2) | (2, 3) | (2, 4) | (2, 5) | (2, 6) | | (2, N) |
| (3, 1) | (3, 2) | (3, 3) | (3, 4) | (3, 5) | (3, 6) | ………… | (3, N) |
| (4, 1) | (4, 2) | (4, 3) | (4, 4) | (4, 5) | (4, 6) | | (4, N) |
| (5, 1) | (5, 2) | (5, 3) | (5, 4) | (5, 5) | (5, 6) | | (5, N) |
| | | ⋮ | | | | ⋱ | |
| (M, 1) | (M, 2) | (M, 3) | (M, 4) | (M, 5) | (M, 6) | | (M, N) |

FIG. 20A

| | | | | | | | PIXEL |
|---|---|---|---|---|---|---|---|
| (1, 3) | (1, 4) | (1, 6) | (1, 5) | (1, 1) | (1, N) | | (1, 2) |
| (2, 3) | (2, 4) | (2, 6) | (2, 5) | (2, 1) | (2, N) | | (2, 2) |
| (3, 3) | (3, 4) | (3, 6) | (3, 5) | (3, 1) | (3, N) | ............ | (3, 2) |
| (4, 3) | (4, 4) | (4, 6) | (4, 5) | (4, 1) | (4, N) | | (4, 2) |
| (5, 3) | (5, 4) | (5, 6) | (5, 5) | (5, 1) | (5, N) | | (5, 2) |
| (M, 3) | (M, 4) | (M, 6) | (M, 5) | (M, 4) | (M, N) | | (M, 2) |

FIG. 20B

| | | | | | | | PIXEL |
|---|---|---|---|---|---|---|---|
| (5, 3) | (5, 4) | (5, 6) | (5, 5) | (5, 1) | (5, N) | | (5, 2) |
| (3, 3) | (3, 4) | (3, 6) | (3, 5) | (3, 1) | (3, N) | | (3, 2) |
| (1, 3) | (1, 4) | (1, 6) | (1, 5) | (1, 1) | (1, N) | ............ | (1, 2) |
| (M, 3) | (M, 4) | (M, 6) | (M, 5) | (M, 1) | (M, N) | | (M, 2) |
| (2, 3) | (2, 4) | (2, 6) | (2, 5) | (2, 1) | (2, N) | | (2, 2) |
| (4, 3) | (4, 4) | (4, 6) | (4, 5) | (4, 1) | (4, N) | | (4, 2) |

CODING APPARATUS AND METHOD, DECODING APPARATUS AND METHOD, DATA PROCESSING SYSTEM, STORAGE MEDIUM, AND SIGNAL

This application is a continuation of U.S. application Ser. No. 09/413,134, filed Oct. 6, 1999, now U.S. Pat. No. 6,804,372 B1.

BACKGROUND

1. Field of the Invention

The present invention relates to a coding apparatus and method, a decoding apparatus and method, a data processing system, a storage medium, and a signal. In particular, the invention relates to a coding apparatus and method, a decoding apparatus and method, a data processing system, a storage medium, and a signal which allow information to be embedded into data without deterioration in decoded data and without increase in data amount.

2. Background of the Invention

An example of a technique of embedding information without increasing the data amount is such that the LSB or the lowest two bits of digital audio data are converted to information to be embedded. In this technique, the fact that the lowest bit or bits of digital audio data do not much influence its sound quality is utilized and the lowest bit or bits of digital audio data are simply replaced by information to be embedded. Therefore, at the time of reproduction, information-embedded digital audio data is output as it is, that is, without returning the lowest bit or bits to the original state. That is, the digital audio data is output in a state that information is embedded therein because it is difficult to return the lowest bit or bits embedded information to the original state and the lowest bit or bits do not much influence the sound quality.

However, in the above technique, a signal that is different from the original signal is output. Therefore, influence occurs in the sound quality when the signal is audio data or in the image quality when the signal is video data.

SUMMARY OF THE INVENTION

An object of the present invention is to solve the above-described problem.

To attain the above object, the invention provides a coding apparatus for coding first data according to second data, comprising a memory for storing at least partial data of the first data; and a coding section for embedding data relating to the second data into the first data by rearranging, according to the second data, the at least partial data of the first data that is stored in the memory.

To attain the above object, the invention provides a decoding apparatus for decoding coded data that has been produced by coding first data according to second data, comprising a correlation calculating section for calculating a correlation between first partial data and second partial data of the coded data; and a decoding section for decoding the coded data into the original, first data by moving the first partial data and the second partial data of the coded data based on the correlation calculated by the correlation calculating section, and for restoring the second data that is embedded in the coded data according to the movement.

BRIEF DESCRIPTION OF THE DRAWINGS

FIG. 6 is a block diagram showing an example hardware configuration of an embedded encoder 3 shown in FIG. 1;

FIG. 7 is a block diagram showing an example functional configuration of the embedded encoder 3 of FIG. 6;

FIG. 8 is a flowchart showing an operation that is executed by the embedded encoder 3 of FIG. 7;

FIG. 19 shows image data before swapping in both of the column and row directions;

FIG. 20A illustrates swapping in the column direction;

FIG. 20B illustrates swapping in the row direction;

DESCRIPTION OF THE INVENTION

A coding apparatus and method, a decoding apparatus and method, a digital processing system, a storage medium, and a signal according to the present invention will be hereinafter described with reference to the accompanying drawings.

Figure 1:
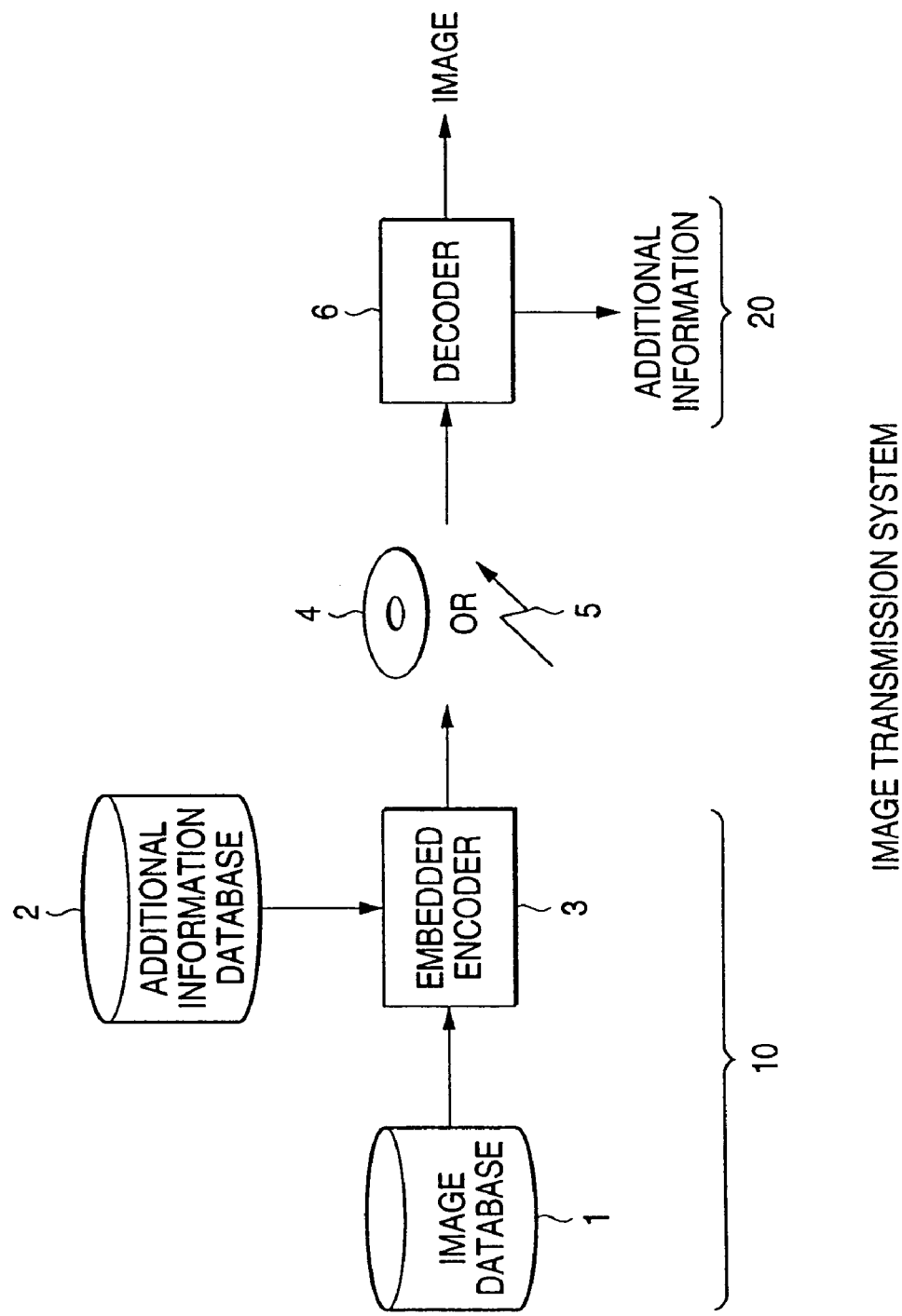
FIG. 1 is a block diagram showing an embodiment of an image transmission system to which the present invention is applied.

FIG. 1 shows an example configuration of an embodiment of an image transmission system to which the invention is applied. The term "system" means a logical collection of a plurality of devices and whether the constituent devices are contained in the same body is irrelevant to the definition of this term.

This image transmission system consists of a coding apparatus 10 and a decoding apparatus 20. The coding apparatus 10 codes an object of coding such as an image and outputs coded data. The decoding apparatus 20 decodes coded data into the original image.

An image database 1 stores images to be coded, for example, digital images. A stored image is read out from the image database 1 and supplied to an embedded encoder 3.

An additional information database 2 stores additional information, such as digital data, as information to be embedded into an image as a coding object. Stored additional information is read out from the additional information database 2 and supplied to the embedded encoder 3, too.

The embedded encoder 3 receives an image from the image database 1 and additional information from the additional information database 2. The embedded encoder 3 codes the image that is supplied from the image database 1 in accordance with the additional information that is supplied from the additional information database 2 in such a manner that decoding will be performed by utilizing an energy deviation of the image, and outputs a resulting image. That is, the embedded encoder 3 codes the image by embedding the additional information into the image in such a manner that decoding will be performed by utilizing an energy deviation of the image, and outputs coded data. The coded data that is output from the embedded encoder 3 is recorded on a recording medium 4 such as a semiconductor memory, a magneto-optical disc, a magnetic disk, an optical disc, a magnetic tape, or a phase change disc. Alternatively, the coded data is transmitted, as a signal, over a transmission medium 5 such as ground waves, a satellite channel, a CATV (cable television) network, the Internet, or public lines, and supplied to the decoding apparatus 20.

The decoding apparatus 20 is a decoder 6, which receives coded data that is supplied via the recording medium 4 or the transmission medium 5. The decoder 6 decodes the coded data into the original image and the additional information by utilizing an energy deviation of the image. The decoded image is supplied to a monitor (not shown), for example, and displayed thereon. The decoded additional information is text data, audio data, a reduced image, or the like that relates to the image.

Next, the principles of the embedded coding in the embedded encoder 3 shown in FIG. 1 and the decoding in the decoder 6 also shown in FIG. 1 will be described.

In general, what is called information has a deviation of energy or entropy and the deviation is recognized as valuable information. For example, the reason why an image that is obtained by photographing a certain scene is recognized by a human as an image of the scene is that the image, for example, pixel values of the respective pixels constituting the image, has an energy deviation corresponding to the scene. An image having no energy deviation is just noise or the like and is useless information.

Therefore, even if the original energy deviation of valuable information is, say, broken, by performing a certain manipulation on the information, the valuable information can be restored by restoring the original energy deviation from the broken one. That is, coded data obtained by coding information can be decoded into the original information by utilizing the original energy deviation of the information.

For example, the deviation of the energy of information is represented by correlation, continuity, similarity, etc.

The correlation of information means correlation between constituent elements (in the case of an image, pixels, lines, or the like that constitute the image), for example, auto correlation, or distance between a certain constituent element and another one of the information. An example of correlation is correlation between two lines of an image that is a correlation value represented by the sum of the squares of the differences between corresponding pixel values.

Figure 2:
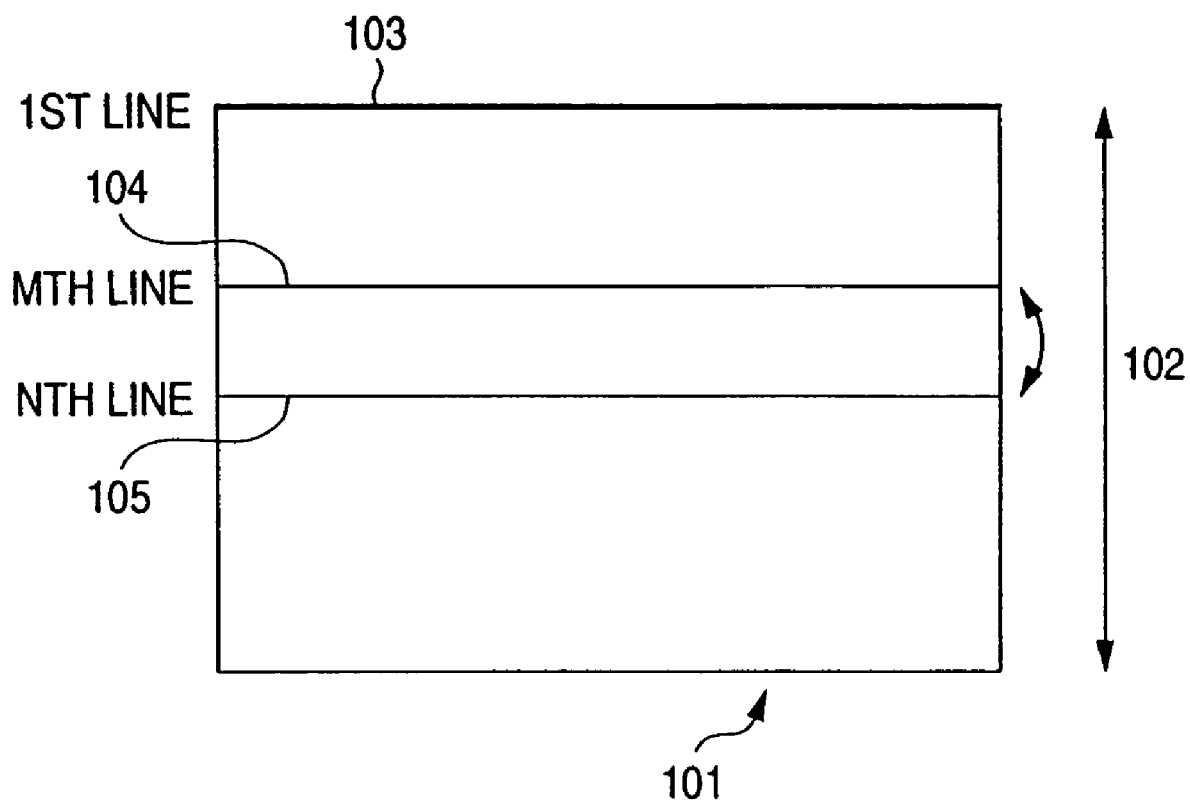
FIG. 2 shows an image as a coding object in the invention.
Figure 3A:
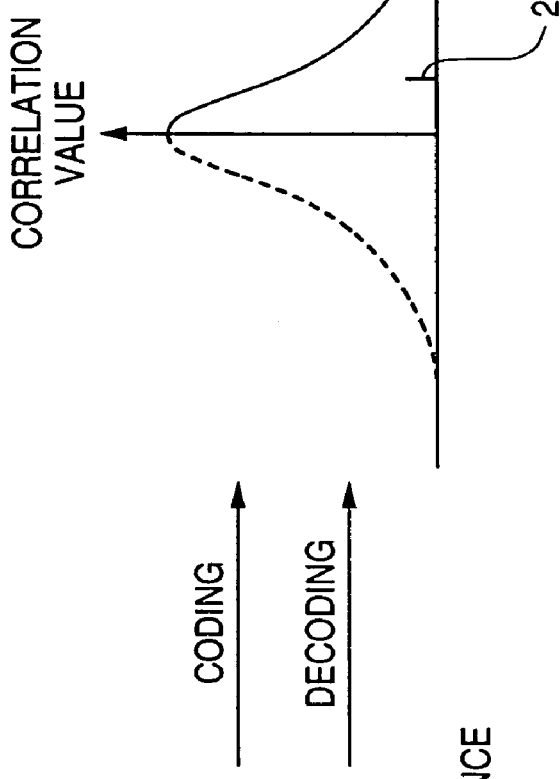
FIG. 3A is a conceptual diagram showing a state before an image is coded by utilizing correlation or a decoding result in the embodiment of the invention.

For example, now assume an image 101 formed by H lines 102 as shown in FIG. 2. In general, as shown in FIG. 3A, the correlation value between the first-row line (first line) 103 from the top of the image and each of the other lines is larger when the line is closer to the first line 103 (i.e., located higher in the image of FIG. 2) as indicated by a correlation value 201 with the Mth line, and is smaller when the line is more distant from the first line 103 (i.e., located lower in the image of FIG. 2) as indicated by a correlation value 202 with the Nth line. That is, there is a deviation of correlation values that the correlation value with the first line 103 is larger for a line closer to the first line 103 and smaller for a line more distant from the first line 103.

In the image 101 of FIG. 2, a manipulation is performed that interchanges the pixel values of the Mth line 104 that is relatively close to the first line 103 with those of the Nth line 105 that is relatively distant from the first line 103. Correlation values between the first line 103 and the other lines in the line-interchanged image 101 are as shown in FIG. 3B, for example.

In the line-interchanged image 101, the correlation value with the Mth line 104 that is close to the first line 103 becomes small as indicated by a correlation value 203 with the Mth line and the correlation value with the Nth line 105 that is distant from the first line 103 becomes large as indicated by a correlation value 204 with the Nth line.

Figure 3B:
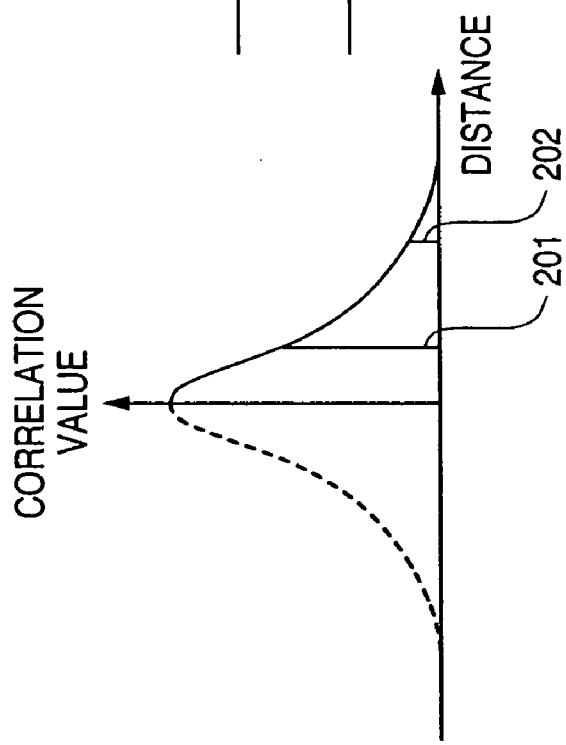
FIG. 3B is a conceptual diagram showing a result obtained by coding the image by utilizing correlation in the embodiment of the invention.

Therefore, in FIG. 3B, the deviation of correlation that the correlation value is larger for a line closer to the first line 103 and smaller for a line more distant from the first line 103 is broken. However, the broken deviation of correlation of the image can be repaired to the original state by utilizing the deviation of correlation that the correlation value is larger for a line closer to the first line 103 and smaller for a line more distant from the first line 103. In FIG. 3B, the facts that the correlation value with the Mth line 104 that is close to the first line 103 is small and the correlation value with the Nth line 105 that is distant from the first line 103 is large are clearly unnatural (A), and hence the original deviation of correlation is restored by interchanging the Mth line 104 and the Nth line 105 with each other. An image having the deviation of correlation shown in FIG. 3A, that is, the original image 101, is restored by interchanging the Mth line 104 and the Nth line 105 in FIG. 3B with each other.

In the case described above with reference to FIGS. 2, 3A and 3B, the image is coded by line interchanging. In the coding, for example, the embedded encoder 3 determines based on additional information which lines should be moved or which lines should be interchanged with each other. On the other hand, the decoder 6 restores the original image from a coded image, that is, a line-interchanged image, by moving the interchanged lines to their original positions by utilizing the correlation of the coded image. Further, in the decoding, at the same time, the decoder 6 restores additional information embedded in the image by detecting, for example, which lines were moved or which lines were interchanged with each other.

Figure 4A:
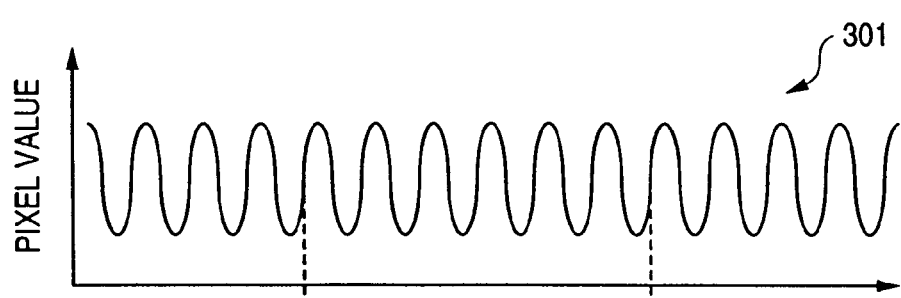
FIG. 4A shows a state before an image is coded by utilizing continuity or a decoding result in the embodiment of the invention.

As for the continuity of information, assume that for a certain line of an image, a waveform 301 as shown in FIG. 4A is observed in which the variation pattern of pixel values is continuous. In another line that is distant from the above line, a variation pattern of pixel values is observed that is different in continuity from the variation pattern of the above line; a deviation of continuity also exists. That is, when attention is paid to a certain pixel value variation pattern, a deviation of continuity is found that a similar pixel value variation pattern exists in an adjacent portion and the pixel value variation pattern becomes more different as the position goes away.

Figure 4B:
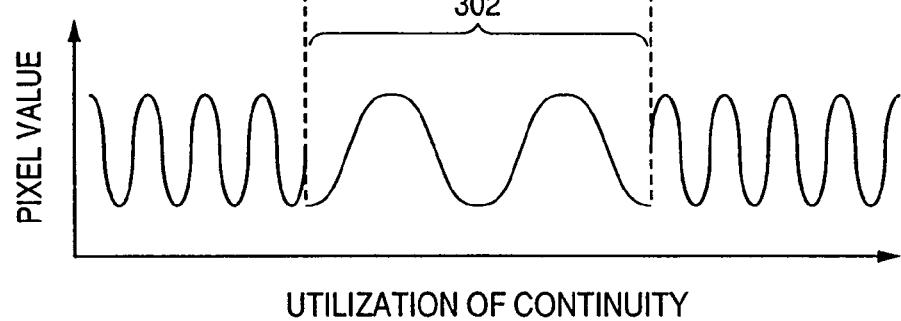
FIG. 4B shows a result obtained by coding the image by utilizing continuity in the embodiment of the invention.

For example, part of the waveform 301 shown in FIG. 4A in which the variation pattern of pixel values is continuous is replaced by a waveform 301 that is distant from the waveform 301 and has a different variation pattern of pixel values as shown in FIG. 4B.

In the case of FIG. 4B, the above-described deviation of continuity is broken. However, the broken deviation of continuity can be repaired by utilizing the deviation of continuity that portions adjacent to each other have continuous pixel value variation patterns and pixel value variation patterns become more different when they are more distant from each other. Specifically, in FIG. 4B, the pixel value variation pattern 302 of the part of the waveform is clearly different from the pixel value variation patterns of the other parts, and hence the deviation of continuity of the original image can be restored by replacing the pixel value variation pattern 302 with a waveform having a pixel value variation pattern similar to the pixel value variation patterns of the other parts. The waveform shown in FIG. 4A, that is, the original waveform, can be restored from the waveform shown in FIG. 4B by performing such replacement.

In the case described above with reference to FIGS. 4A and 4B, the image coding is to replace part of the waveform with a pixel value variation pattern that is much different from adjacent pixel value variation patterns. In the coding, for example, the embedded encoder 3 determines based on additional information what part of the waveform should be changed greatly in pixel value variation pattern and how greatly the pixel value variation pattern should be changed. The decoder 6 restores the original waveform from a coded signal, that is, a waveform having a part with a much different pixel value variation pattern by utilizing the deviation of continuity that adjacent pixel value variation patterns are continuous and pixel value variation patterns become more different when they are more distant from each other. Further, in the decoding, at the same time, the decoder 6 restores embedded additional information by detecting, for example, what part of the waveform was changed greatly in pixel value variation pattern and how greatly the pixel value variation pattern was changed.

As for the similarity of information, it is known that part of an image obtained by photographing a scene, for example, is generated by utilizing fractal, that is, auto similarity, of the image. For example, a photographed image of a sea 401 and a forest 402 shown in FIG. 5A has a deviation of similarity that the similarity between the pixel value variation pattern of a portion of the sea 401 and that of another portion of the sea 401 is high but the similarity between the pixel value variation pattern of the same portion and that of a portion in the forest 402 that is distant from the sea 401 is low. The same thing is true of the similarity of a shape itself such as an edge shape pattern of an image portion rather than a pixel value variation pattern.

Figure 5A:
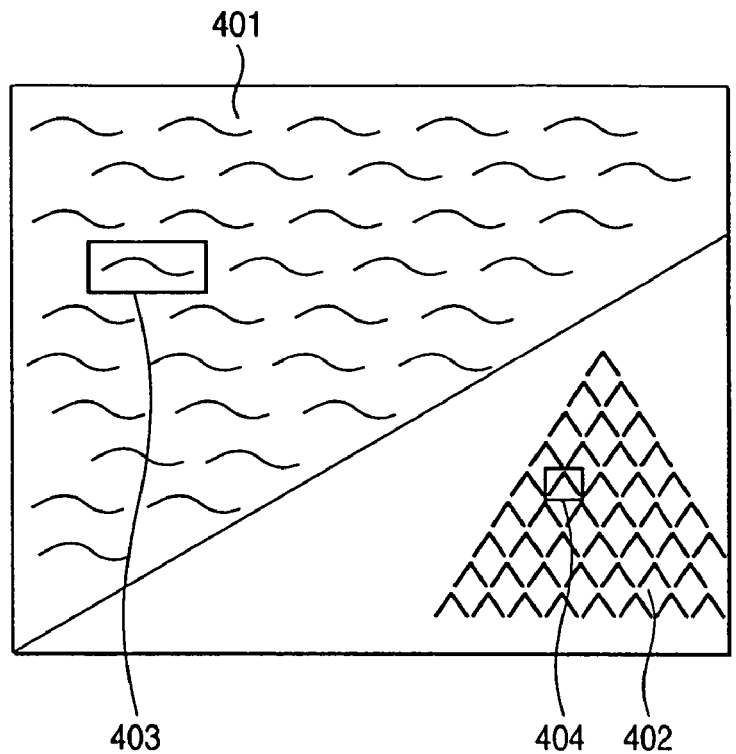
FIG. 5A shows a state before an image is coded by utilizing similarity or a decoding result in the embodiment of the invention.
Figure 5B:
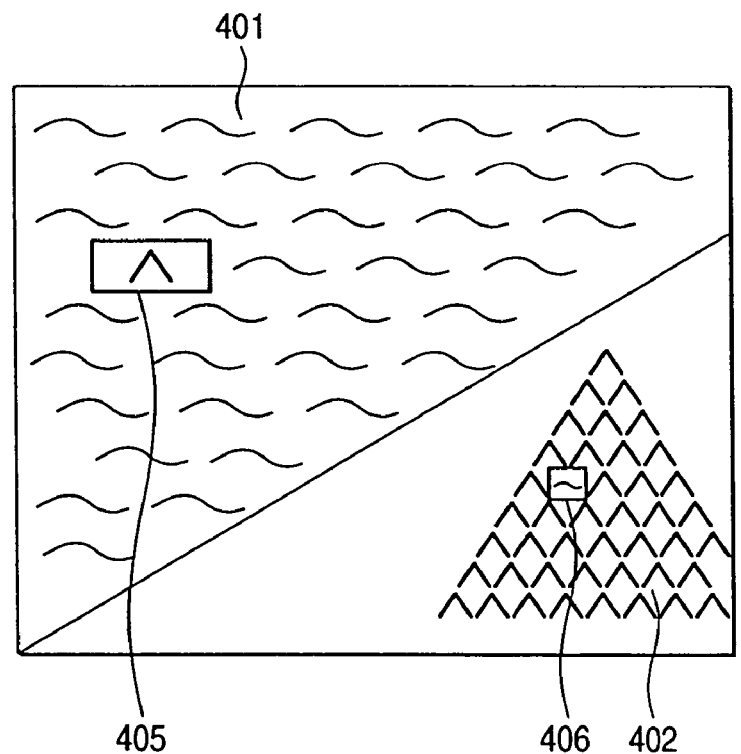
FIG. 5B shows a result obtained by coding the image by utilizing similarity in the embodiment of the invention.

For example, a part 403 of the sea 401 shown in FIG. 5A is replaced by a part 404 of the forest 402 as shown in FIG. 5B.

In FIG. 5B, the above-described deviation of similarity is broken. However, the broken deviation of similarity can be repaired by utilizing the deviation of similarity that adjacent pixel value variation patterns are high in similarity and the similarity becomes lower when pixel value variation patterns are more distant from each other specifically, in FIG. 5B in which part of image of the sea 401 is made a part 405 of the image of the forest 402, the similarity between a portion in the sea 401 and the replaced part 405 of the image of the forest 402 is clearly lower than the similarity between portions within the image of the sea 401. The deviation of similarity of the original image is restored by replacing the part 405 that is made the image of the forest 402 with an image having characteristics that are similar to those of an image of the sea 401 around that part 405, that is, a part 406 of the image of the sea 401. The image shown in FIG. 5A, that is, the original image, is restored from the image shown in FIG. 5B by performing such replacement.

In the case described above with reference to FIGS. 5A and 5B, the image coding is to replace the part 403 of the image of the sea 402 with the part 404 of the image of the forest 402. In the coding, for example, the embedded encoder 3 determines based on additional information what part (e.g., a position on the picture) of the image of the sea 401 should be replaced by the part 404 of the image of the forest 402. The decoder 6 restores the original image shown in FIG. 5A from a coded signal, that is, the image of the sea 401 having the part 405 of the image of the forest 402 by utilizing the deviation of similarity of the coded signal that adjacent pixel value variation patterns are high in similarity and the similarity becomes lower when pixel value variation patterns are more distant from each other. Further, in the decoding, at the same time, the decoder 6 restores embedded additional information by, for example, detecting what part of the image of the sea 401 was replaced by part of the image of the forest 402.

As described above, the embedded encoder 3 codes a coding object image in accordance with additional information so that decoding will be performed by utilizing an energy deviation of the image. The decoder 6 decodes coded data into the original image and the additional information without any overhead for decoding by utilizing an energy deviation of the image.

Since additional information is embedded into a coding object image, a resulting coded image is rendered different from the original state and unrecognizable as valuable information. That is, encryption of the coding object image without any overhead is realized.

Further, completely reversible digital watermarking is realized. For example, in the conventional digital watermarking, the lowest bits of pixel values that do not much influence the image quality are simply changed to values corresponding to a digital watermark. However, it is difficult to return the lowest bits to the original values. Therefore, changing the lowest bits as digital watermarking causes deterioration in the image quality of a decoded image. In the embedded coding of the invention, in the case where coded data is decoded by utilizing an energy deviation of the original image, the original image having no deterioration and additional information are obtained. Therefore, the image quality of a decoded image is not deteriorated even if the additional information is used as digital watermarking information.

Since embedded additional information is taken out by decoding coded data into an image, side information is provided without any overhead. In other words, since additional information is embedded into an image without any overhead that is usually necessary to take out the additional information, coded data that is obtained as a result of the embedding is compressed by an amount corresponding to the additional information. For example, if a half of an image is made a coding object and the other half is made additional information and if the latter half of the image is embedded into the half image as the coding object, the image is simply compressed into ½ of the original image.

Since coded data is decoded by utilizing an energy deviation of the original image which is, so to speak, a statistical quantity, the error resistance is high. That is, robust coding which is coding high in robustness is realized.

Since coded data is decoded by utilizing an energy deviation of the original image, there is a possibility that more additional information is embedded when the energy deviation is more characteristic, that is, when, in the case of an image, the activity of the image is higher or its redundancy is lower. As described above, coded data obtained as a result of embedding of additional information is compressed by an amount corresponding to the additional information. That is, the compression ratio is larger when the activity of the image is higher or the redundancy of the image is lower. For example, in the MPEG (Moving Picture Experts Group) scheme which is a conventional coding scheme, basically the compression ratio is smaller when the activity of an image is higher or the redundancy of an image is lower. The embedded coding scheme of the invention is much different from the conventional coding schemes in this respect.

An image can be provided with a voice used as a key by making an image a coding object and employing, as additional information, information of a different medium than an image, for example, a voice. Specifically, on the coding apparatus 10 side, a voice spoken by the subscriber, such as "Open sesame," is embedded as additional information into an image. On the decoding apparatus 20 side, a user is caused to speak a voice "Open sesame" and speaker recognition is performed by comparing the voice of the user with the voice embedded in the image. This speaker recognition allows automatic presentation of the image only when the user is recognized as the subscriber. A voice waveform itself, as well as what is called a feature parameter of a voice, can be used as a voice as additional information.

A voice can be provided with an image used as a key (e.g., voice response after face recognition) by making a voice a coding object and employing, as additional information, information of a media different than a voice, for example, an image. Specifically, on the coding apparatus 10 side, an image of the face of a user is embedded into, for example, a voice as a response to the user. On the decoding apparatus 20 side, the face of a user is photographed and a voice in which a face image that matches the photographed image is embedded is output. In this manner, a voice response system that makes voice responses that are different for respective users is realized.

It is also possible to embed information of a certain medium into another information of the same medium such as embedding one voice into another voice or embedding one image into another image. Further, by embedding a voice and a face image of the subscriber, what is called a double key system can be realized in which an image can be presented only when a voice and a face image of a user coincide with those embedded in the image.

For example, it is also possible that one of an image and a voice that constitute a television broadcast signal and are, so to speak, synchronized with each other is embedded into the other. In this case, what is called a true integrated signal can be realized in which pieces of information of different media are integrated with each other.

In the embedded coding scheme of the invention, as described above, more additional information may be embedded into information when the energy deviation of the information is more characteristic. Therefore, the overall data amount is controlled by, for example, adaptively selecting one of two pieces of information having a more characteristic energy deviation and embedding the other into the selected piece of information. That is, it becomes possible to cause one of two pieces of information to absorb the information quantity of the other. Controlling the overall data amount enables information transmission using a data amount that conforms to the transmission bandwidth and the use status of a transmission line and other factors of the transmission environment (i.e., environment-adaptive network transmission).

For example, coding in which higher-layer information having a smaller information quantity than lower-layer information is generated (what is called layered coding) is realized without increasing the data amount by embedding a reduced image into the original image or by embedding a decimated voice into the original voice.

For example, by embedding an image to serve as a key for retrieving each original image into each original image, a database is realized in which an image is retrieved based on a key image.

FIG. 6 shows an example hardware configuration of the embedded encoder 3 shown in FIG. 1 which performs embedded coding in which additional information is embedded into an image so that the original image can be restored by utilizing the correlation of the image.

An image that is supplied from the image database 1 is supplied to a frame memory 31. The frame memory 31 temporarily stores, for example, on a frame-by-frame basis, the image supplied from the image database 1.

A CPU (central processing unit) 32 executes a program stored in a program memory 33 and performs controls so that an embedded coding operation (described later) is performed. That is, the CPU 32 receives additional information that is supplied from the additional information database 2 and controls the entire embedded encoder 3 according to the program so that the additional information is embedded into the image stored in the frame memory 31. Specifically, the CPU 32 performs controls so that the additional information is embedded into each column by rearranging the positions of the pixels that constitute the image stored in the frame memory 31 in accordance with the additional information on a column-by-column basis, for example (column: a vertical array of pixels). The CPU 32 performs a control so that an image in which the additional information is embedded is output as coded data.

Being a ROM (read-only memory) or a RAM (random access memory), for example, the program memory 33 stores a computer program for causing the CPU 32 to perform an embedded coding operation.

To be capable of storing a plurality of frames, the frame memory 31 is composed of a plurality of banks. By making switching among the banks, the frame memory 31 simultaneously perform storage of an image that is supplied from the image database 1, storage of an image as an object of an embedded coding operation of the CPU 32, and output of an image produced by the embedded coding operation, that is, coded data. Coded data is output on a real-time basis even if the image supplied from the image database 1 is a moving picture.

FIG. 7 shows an example functional configuration of the embedded encoder 3 of FIG. 6. The functional configuration shown in FIG. 7 is realized by the CPU 32's executing a computer program stored in the program memory 33.

As described above with reference to FIG. 6, the frame memory 31 temporarily stores an image that is supplied from the image database 1.

A swap information generation section 36 reads out additional information from the additional information database 2, and generates, based on the additional information, swap information that indicates how the positions of the respective columns of the one-frame image stored in the frame memory 31 should be rearranged. When the one frame image stored in the frame memory 31 consists of M-row/N-column pixels and the nth column (from the left end) of the image is to move to the nth column, the swap information generation section 36 generates swap information that correlates n with n', where n and n' are integers of 1 to N.

Where a one-frame image consists of N columns, there are N! ("!" means factorial) kinds of manners of rearranging the columns if all the columns are to be subjected to the rearrangement. Therefore, additional information of $\log_2(N!)$ bits is embedded in one frame.

Swap information generated by the swap information generation section 36 is supplied to a swapping section 37. The swapping section 37 rearranges the positions of the respective columns of the one-frame image stored in the frame memory 31 according to the swap information that is supplied from the swap information generation section 36.

An embedded coding process that is executed in the embedded encoder 3 of FIG. 7 will be described below with reference to a flowchart of FIG. 8.

Stored images are read out from the image database 1, sequentially supplied to the frame memory 31, and stored therein.

At step S1, the swap information generation section 36 reads out, from the additional information database 2, additional information of a data amount that can be embedded into a one-frame image. For example, as described above, when a one-frame image consists of N columns and all the columns are to be subjected to rearrangement, additional information of a maximum of $\log_2(N!)$ bits can be embedded into one frame. Additional information of $\log_2(N!)$ bits or less is read out from the additional information database 2.

The process then goes to step S2, where the swap information generation section 36 generates swap information based on the addition information that was read out at step S1. Specifically, based on the additional information, the swap information generation section 36 generates swap information that indicates to which columns the second to Nth columns (excluding the first column), for example, among the first to Nth columns of the processing object frame that is stored in the frame memory 31 should be moved. The swap information is supplied to the swapping section 37.

When the swapping section 37 receives the swap information from the swap information generation section 36, the process goes to step S3, where the swapping section 37 rearranges the positions of the respective columns of the processing object frame that is stored in the frame memory 31 according to the swap information. A column-position-rearranged frame is read out from the frame memory 31 and output as coded data. A column-position-rearranged frame may be read out after the memory positions of the respective columns of the image stored in the frame memory 31 have been rearranged. Alternatively, the CPU 32 may perform a control so that output data will be rendered in a "data rearranged state" through changing of readout order.

In this embodiment, as described above, although the swap information includes information indicating to which columns the second to Nth columns should be moved, it does not include information indicating to which column the first column should be moved. Therefore, while the swapping section 37 moves the second to Nth columns, it does not move the first column.

When all of the second to Nth columns of the processing object frame have been subjected to the rearrangement, the process goes to step S4, where it is judged whether the frame memory 31 stores a frame that has not been made an object of processing. If it is judged that the frame memory 31 stores such a frame, the process returns to step S1 and operations similar to the above are performed for the frame that has not been processed yet.

If it is judged at step S4 that the frame memory 31 does not store a frame that has not been made an object of processing, the embedded coding process is finished.

According to the above embedded coding process, a one-frame image is coded into coded data in the following manner.

Figure 9A:
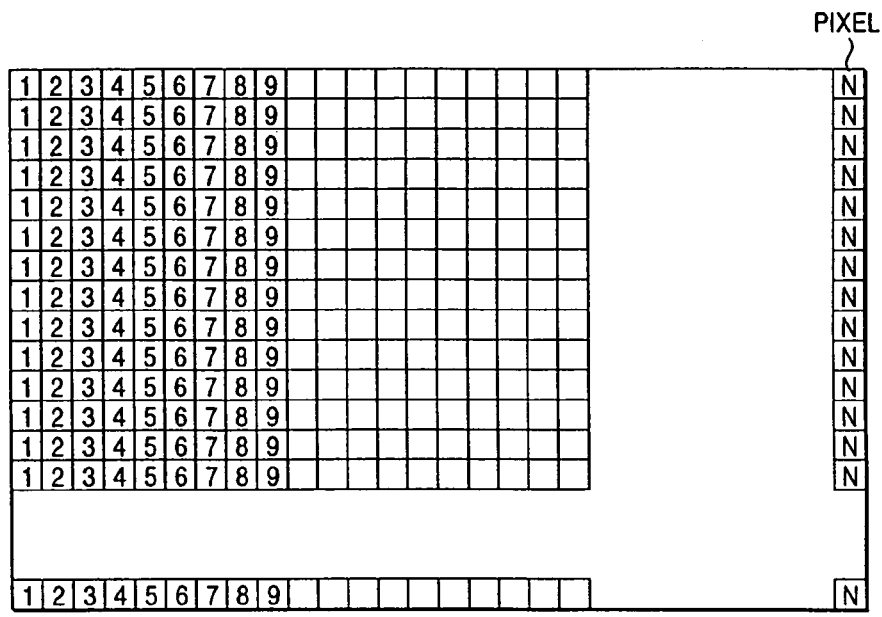
FIG. 9A shows an image before embedding of additional information by the embedded coding process of FIG. 8.

For example, if the additional information corresponds to rearrangement that the second column of the processing object frame is moved to the sixth column (indicated by reference numeral 411), the third column to the ninth column 412, the fourth column to the seventh column 413, the fifth column to the third column 414, the sixth column to the eighth column 415, the seventh column to the fourth column 416, the ninth column to the second column 417, the eighth column to the fifth column 418, . . . , the Nth column to the Nth column, the swap information generation section 36 generates swap information indicating such rearrangement. According to the above swap information, the swapping section 37 rearranges, for example, a frame shown in FIG. 9A in a manner shown in FIG. 9B, that is, in such a manner that the second column is moved to the sixth column (indicated by reference numeral 411), the third column to the ninth column 412, the fourth column to the seventh column 413, the fifth column to the third column 414, the sixth column to the eighth column 415, the seventh column to the fourth column 416, the ninth column to the second column 417, the eighth column to the fifth column 418, . . . , the Nth column to the Nth column. As a result, the image of FIG. 9A is coded into an image shown in FIG. 9C.

Figure 9B:
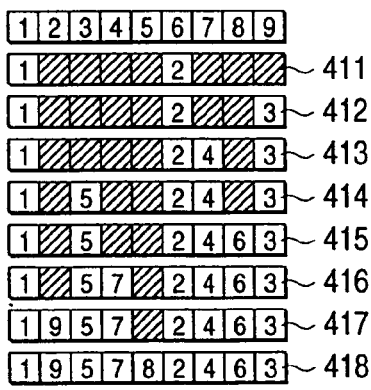
FIG. 9B shows a manner of swapping of step S3 shown in FIG. 8.
Figure 9C:
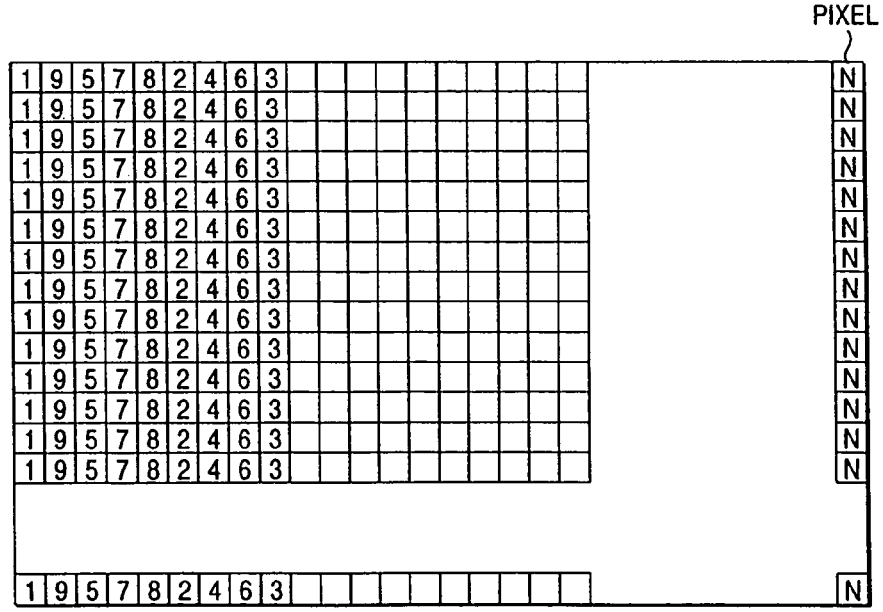
FIG. 9C shows an image after completion of the swapping of step S3 shown in FIG. 8.

The relationship between the rearrangement and the embedding information will be described below briefly with reference to FIG. 9B.

As indicated by reference numeral 411, the destination of movement of the second column is determined from among the available regions of eight columns. Since there are eight kinds of choices, the embedded encoder 3 can embed additional information that is any of 0, 1, 2, 3, 4, 5, 6, and 7, for example. In the example of FIG. 9B, since the second column is moved to the sixth column, that is, the fifth region, additional information "4" is embedded.

Then, as indicated by reference numeral 412, the movement destination of the third column is determined from among the available regions of seven columns. Since there are seven kinds of choices, the embedded encoder 3 can embed additional information that is any of 0, 1, 2, 3, 4, 5, and 6, for example. In the example of FIG. 9B, since the third column is moved to the ninth column, that is, the seventh region, additional information "6" is embedded.

From the next step onward, additional information is embedded into the image by similar operations. In this embedding technique, the number of bits of additional information to be embedded decreases as the embedding operation proceeds.

Instead of the above rearrangement scheme in which operations of moving each column into a column that is distant from it by pixels of the same number as the value of additional information are performed sequentially, when the additional information is image data, each column may be moved according to a feature quantity of the image data such as a histogram, DR, variance.

Further, although in the above example the embedded encoder 3 embeds pieces of additional information sequentially, an arrangement order pattern itself as one of arrangement order patterns of the number of kinds that is equal to factorial the number of all columns may be determined by additional information. When additional information is embedded in the form of an arrangement order pattern, all arrangement order patterns of factorial the number of all columns are checked one by one and one arrangement order pattern is determined based on the correlation between the columns, whereby the embedded image is decoded into the original image.

The swapping section 37 moves, according to additional information, the positions of the pixels of each column as a set of one or more pixels constituting the image stored in the frame memory 31. The additional information is embedded into each column through the rearrangement by the swapping section 37. The original image is restored by performing rearrangement that is reverse to the rearrangement by the swapping section 37, and information indicating what rearrangement was performed is made additional information. Therefore, the embedded encoder 3 can embed additional information into an image without deteriorating its image quality and without increasing the data amount.

Each column of a column-position-rearranged image that is an additional-information-embedded image can be moved to the original position without any overhead by utilizing the correlation of the image, that is, the correlation with a column that is located at the correct position as in the case of the original image. Further, additional information is restored through such rearrangement. Therefore, a decoded image has no deterioration in image quality owing to the embedding of the additional information.

When there exists no column that is located at the correct position in coded data, it takes time to restore an image and additional information by utilizing the correlation of the image in the above-described manner. In the embedded coding process of FIG. 8, the first column of each frame is not moved and output as part of coded data as it is.

It is possible to perform embedded coding by making all columns including the first column an object of rearrangement. An image and additional information can easily be restored if coded data includes, as overhead, information of the original position of at least one of rearranged columns.

Figure 10:
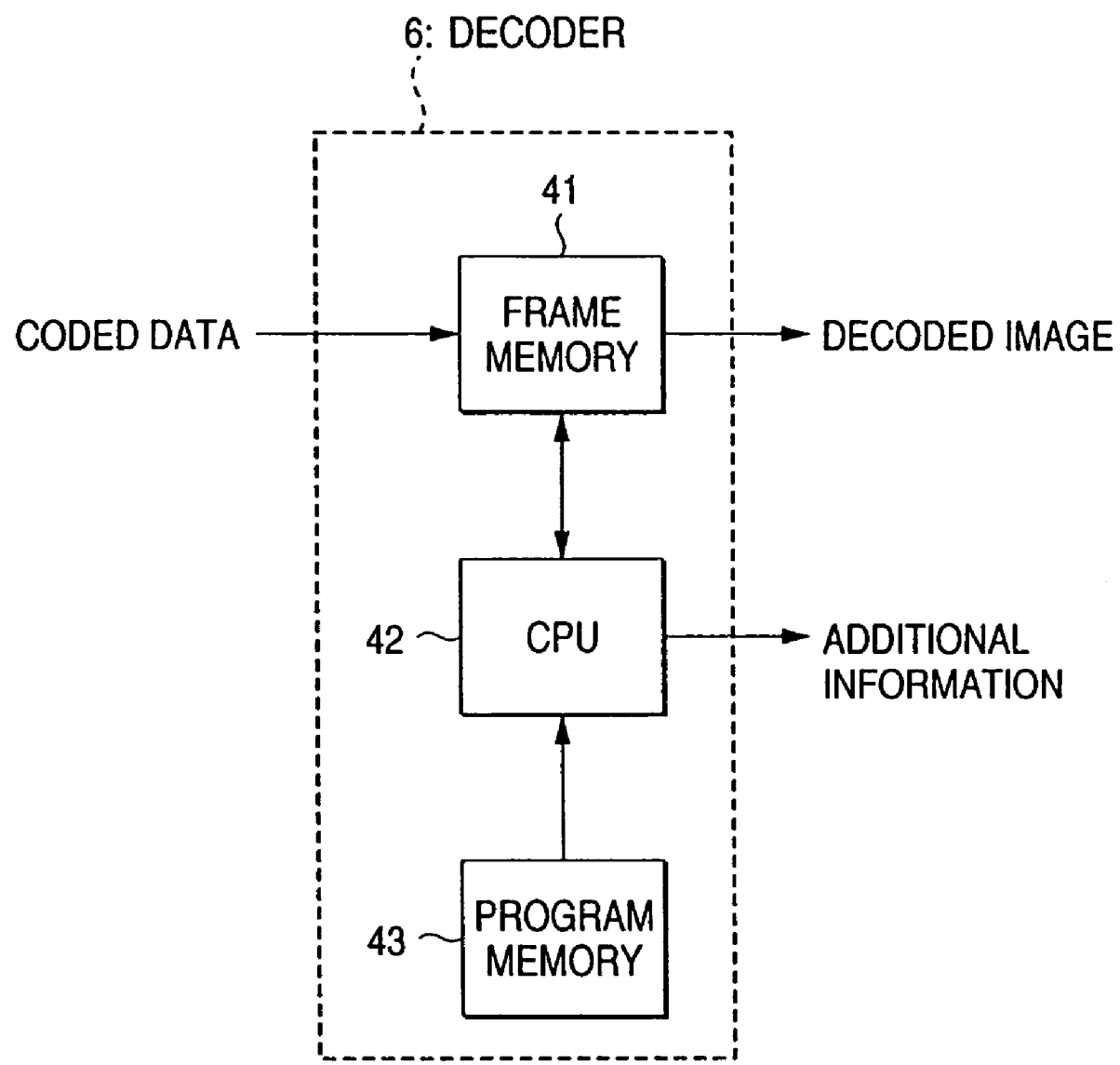
FIG. 10 is a block diagram showing an example hardware configuration of a decoder 6 shown in FIG. 1.

FIG. 10 shows an example hardware configuration of the decoder 6 shown in FIG. 1 which decodes coded data that is output from the embedded encoder 3 of FIG. 7 into the original image and the additional information by utilizing the correlation of the image.

Coded data, that is, an additional-information-embedded image (also called an embedded image), is supplied to a frame memory 41. The frame memory 41 temporarily stores the embedded image on a frame-by-frame basis, for example. Configured in the same manner as the frame memory 31 shown in FIG. 6, through bank switching the frame memory 41 can process an embedded image on a real-time basis even if it is a moving picture.

A CPU 42 executes a program stored in a program memory 43, and performs controls to the decoder 6 so that a decoding operation is performed. That is, the CPU 42 controls the decoder 6 so that the embedded image stored in the frame memory 41 is decoded into the original image and the additional information by utilizing the correlation of the image. Specifically, the CPU 42 calculates correlation values between the latest decoded column and other columns among the columns constituting the embedded image. The CPU 42 performs, for every column constituting the embedded image, an operation of moving the column having the maximum correlation value with the latest decoded column to the position immediately on the right of the latest decoded column. The CPU 42 restores the original image in this manner and also restores the additional information based on the manner of rearrangement of the positions of the respective columns of the embedded image in decoding the embedded image into the original image.

Configured in the same manner as the program memory 33 shown in FIG. 6, for example, the program memory 43 stores a computer program for causing the CPU 42 to perform a decoding operation.

Figure 11:
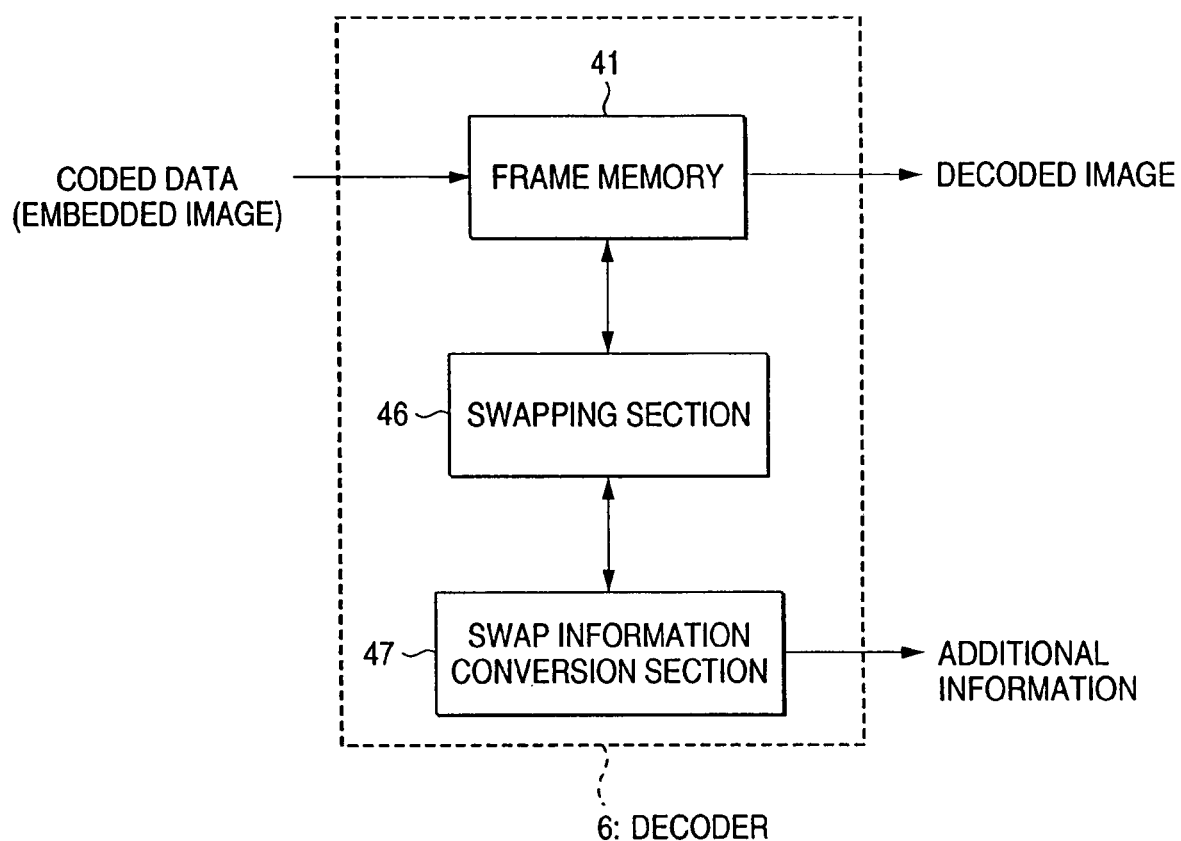
FIG. 11 is a block diagram showing an example functional configuration of the decoder 6 of FIG. 10.

FIG. 11 shows an example functional configuration of the decoder 6 of FIG. 10. The functional configuration shown in FIG. 11 is realized by the CPU 42's executing a computer program stored in the program memory 43.

As described above with reference to FIG. 10, the frame memory 41 temporarily stores an embedded image.

A swapping section 46 calculates correlation values between the latest one of the columns that have been moved to the original positions and other columns (i.e., the columns that have not been returned to their original positions) in the processing object frame stored in the frame memory 41. Based on those correlation values, the swapping section 46 rearranges the positions of the columns in the processing object frame that have not been returned to their original positions and thereby returns those columns to their original positions (i.e., restores the positions of those columns). Further, the swapping section 46 supplies a swap information conversion section 47 with swap information that represents how the columns of the frame have been rearranged.

The swap information conversion section 47 restores the additional information that is embedded in the embedded image based on the swap information that is supplied from the swapping section 46, that is, the corresponding relationship between the positions of the respective columns of the processing object frame before the rearrangement and those after the rearrangement.

A decoding process that is executed in the decoder 6 of FIG. 11 will be described below with reference to a flowchart of FIG. 12.

The frame memory 41 sequentially stores embedded images (i.e., coded data) supplied thereto on a frame-by-frame basis, for example.

At step S11, in the swapping section 46, variable n for counting the number of columns of the frame is set to an initial value that is "1," for example. The process then goes to step S12, where the swapping section 46 judges whether variable n is smaller than or equal to N−1 (i.e., the number N of columns of the frame minus one).

If it is judged at step S12 that variable n is smaller than or equal to N−1, the process goes to step S13, where the swapping section 46 reads out the pixels (or the pixel sequence) of the nth column of the processing object frame stored in the frame memory 41 and generates a vector (i.e., a column vector) $v_n$ in which the pixel values of the respective pixels of the nth column are arranged as elements. In this embodiment, since as described above each frame consists of pixels of M rows, the column vector $v_n$ is an M-dimensional vector. The same thing applies to a vector $v_k$ (described later).

At step S14, variable k for counting columns that are located on the right of the nth column is set to an initial value that is n+1. The process then goes to step S15, where the swapping section 46 reads out the pixels of the kth column and generates a column vector $v_k$ that has the pixel values of the kth column as elements. The process then goes to step S16.

At step S16, in the swapping section 46, a correlation value between the nth column and the kth column is calculated by using the column vectors $v_n$ and $v_k$.

Specifically, in the swapping section 46, the distance d(n, k) between the column vectors $v_n$ and $v_k$ is calculated according to the following equation:

$$d(n, k) = |v_n - v_k| \qquad (1)$$
$$= \left[\sum \{A(m, n) - A(m, k)\}^2\right]^{1/2}$$

where Σ means the summation with m varied from 1 to M and A(i, j) represents the ith-row, jth-column pixel value of the frame as the processing object.

In the swapping section 46, the reciprocal 1/d(n, k) of the distance d(n, k) between the column vectors $v_n$ and $v_k$ is calculated as a correlation value between the nth column and the kth column.

After the calculation of the correlation value between the nth column and the kth column, the process goes to step S17, where it is judged whether variable k is smaller than or equal to N−1 that is the number N of columns of the frame minus 1. If it is judged at step S17 that variable k is smaller than or equal to N−1, the process goes to step S18, where variable k is incremented by 1. The process then returns to step S15. Thereafter, steps S15 to S18 are repeatedly executed until it is judged at step S17 that variable k is not smaller than or equal to N−1. As a result, correlation values between the nth column and the columns of the embedded image on the right of the nth column are calculated.

If it is judged at step S17 that variable k is not smaller than or equal to N−1, the process goes to step S19, where the swapping section 46 determines the k that maximizes the correlation value with the nth column. Let K represent the k that maximizes the correlation value with the nth column. At step S20, the swapping section 46 swaps the (n+1)th column and the Kth column of the processing object frame stored in the frame memory 41, that is, interchanges the Kth column with the (n+1)th column that is immediately on the right of the nth column. variable n is incremented by 1 at step S21, and the process returns to step S12. Thereafter, steps S12 to S21 are repeatedly executed until it is judged at step S12 that variable n is not smaller than or equal to N−1.

In this embodiment, the first column of the embedded image remains the same as the first column of the original image. Therefore, when variable n is equal to the initial value "1," the column of the embedded image having the maximum correlation value with the first column is interchanged with the second column that is immediately on the right of the first column. From the correlation of the image, the column having the maximum correlation value with the first column should be the second column of the original image. Therefore, the second column of the original image that was moved to become a certain column of the embedded image in the embedded coding operation is now returned to the original position, which means decoding.

When variable n is incremented to 2, in the above-described manner the column of the embedded image having the maximum correlation value with the second column returned to the original position is interchanged with the third column that is immediately on the right of the second column. From the correlation of the image, the column having the maximum correlation value with the second column should be the third column of the original image. Therefore, the third column of the original image that was moved to become a certain column of the embedded image in the embedded coding operation is now returned to the original position.

In similar manners, the embedded image that is stored in the frame memory 41 continues to be decoded into the original image.

If it is judged at step S12 that variable n is not smaller than or equal to N−1, that is, when all of the second to Nth columns constituting the embedded image have been returned to their original positions by utilizing the correlation of the image and the embedded image stored in the frame memory 41 has thereby been decoded into the original image, the process goes to step S22, where a decoded image is read out from the frame memory 41. At step S22, swap information that represents how the second to Nth columns of the embedded image were rearranged when the swapping section 46 decoded the embedded image into the original image is output to the swap information conversion section 47. The swap information conversion section 47 restores the additional information that was embedded in the embedded image based on the swap information from the swapping section 46, and outputs the restored additional information.

The process then goes to step S23, where it is judged whether the frame memory 41 stores an embedded image frame that has not been made an object of processing. If it is judged that such a frame is stored, the process returns to step S11, where operations similar to the above are repeated for the embedded image frame that has not been made an object of processing.

If it is judged at step S23 that the frame memory 41 does not store a frame that has not been made an object of processing, the decoding process is finished.

As described above, the decoder 6 decodes coded data that is an image in which additional information is embedded into the original image and the additional information by utilizing the correlation of the image. The decoder 6 can decode coded data into the original image and the additional information even without any overhead for decoding. Therefore, the embedding of additional information causes no deterioration in image quality in a decoded image that is produced by the decoder 6.

Figure 12:
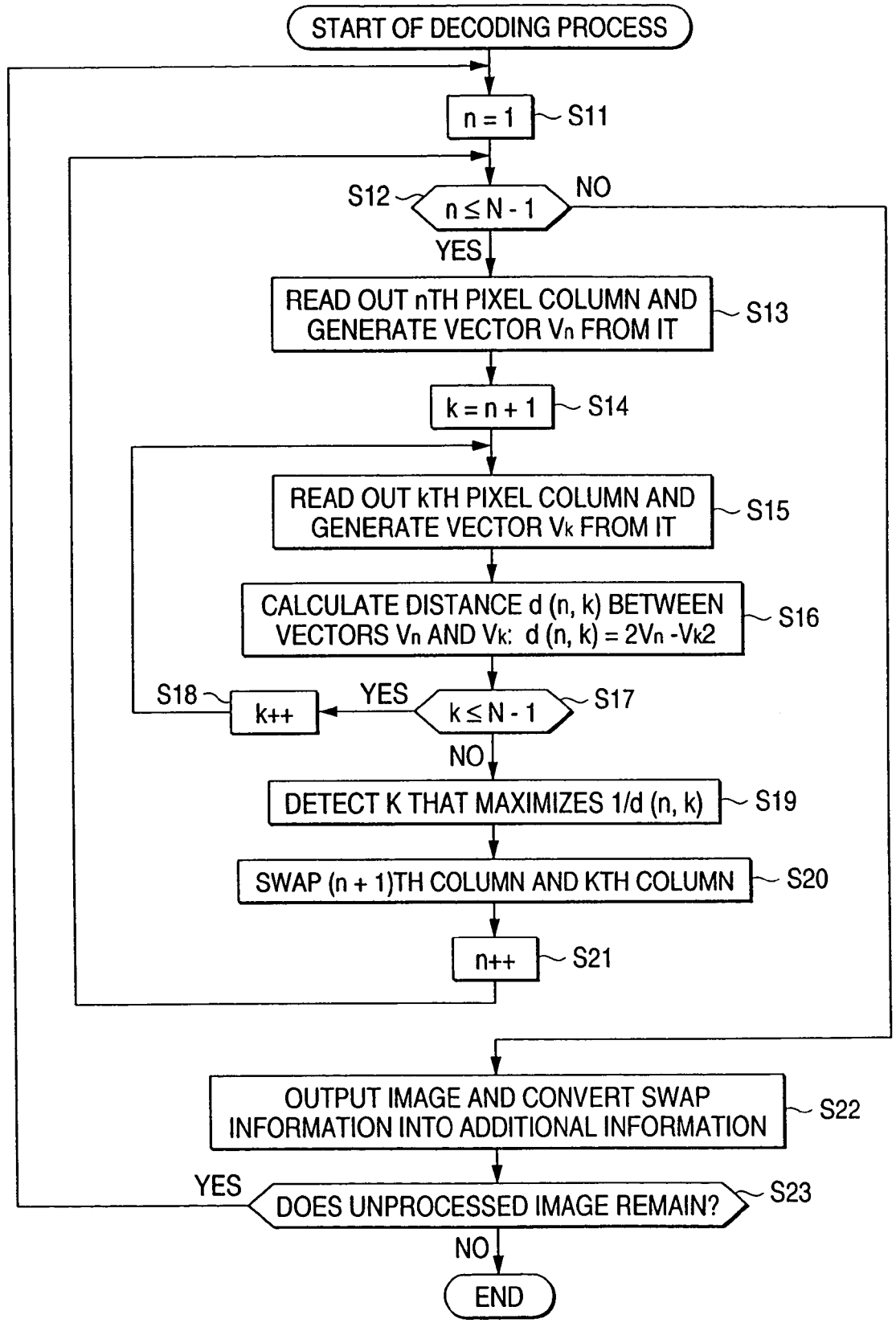
FIG. 12 is a flowchart showing an operation that is executed by the decoder 6 of FIG. 11.

In the decoding process of FIG. 12, the decoder 6 calculates correlation values between the latest decoded column (the first column that was not moved in embedded coding, when n=1, for example) and the columns that have not been decoded and detects a column that should be moved to the position immediately on the right of the latest decoded column based on the calculated correlation values. For example, it is possible for the decoder 6 to detect a column that should be moved to the position immediately on the right of the latest decoded column by calculating correlation values between a plurality of columns that have been decoded and the columns that have not been decoded.

Figure 13:
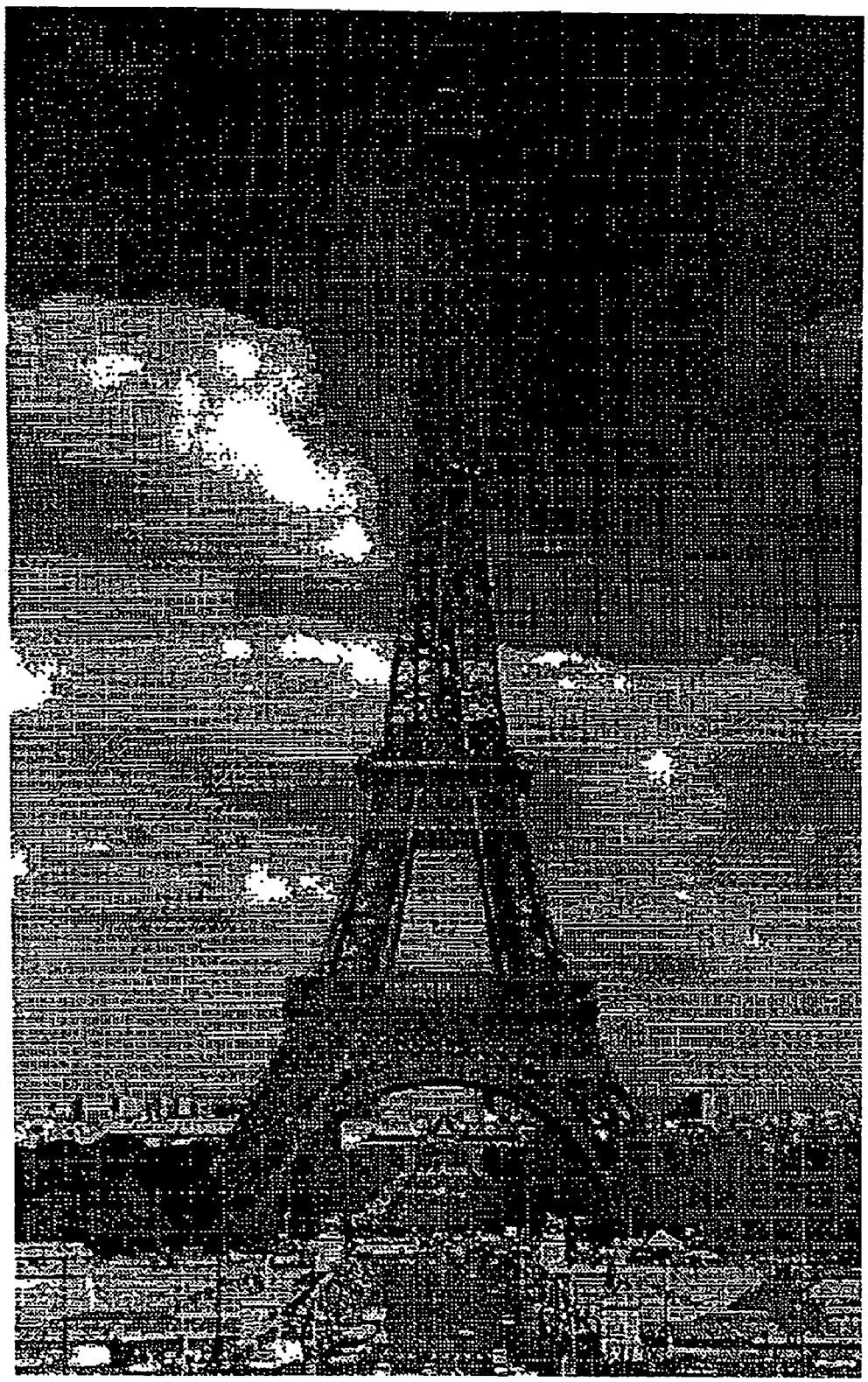
FIG. 13 is a photograph of an original image that was used in a simulation of the embedded coding process of FIG. 8.
Figure 14:
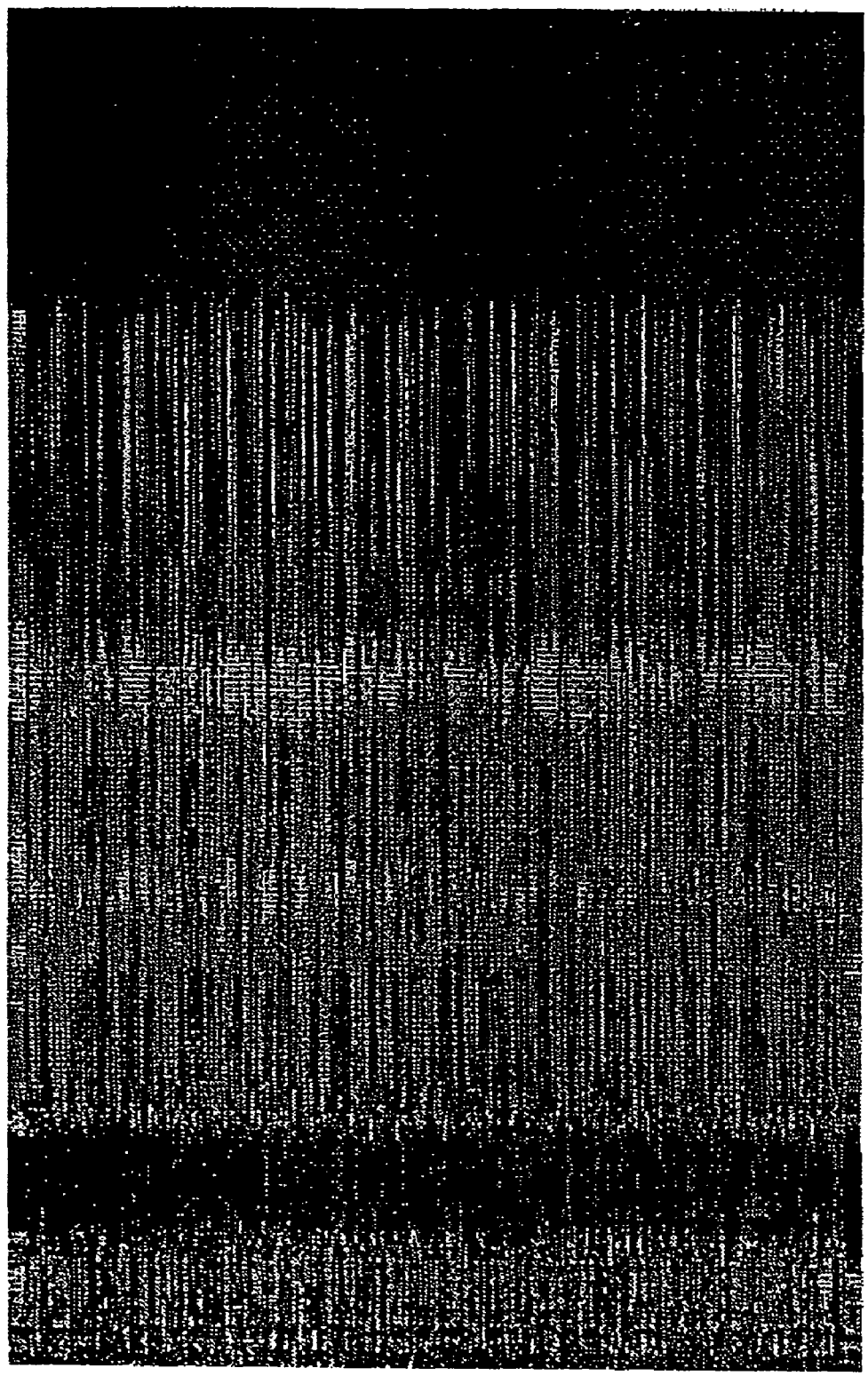
FIG. 14 is a photograph of an image as a simulation result of the embedded coding process of FIG. 8.
Figure 15:
FIG. 15 is a photograph of an image as a simulation result of the decoding process of FIG. 12.

FIGS. 13 to 15 show simulation results of the above embedded coding process and decoding process.

FIG. 13 shows an original image that was subjected to an embedded coding operation and that consists of 512 (horizontal)×832 (vertical) pixels when the longitudinal direction is made the vertical direction.

FIG. 14 shows a processing result of the embedded coding operation that was performed on the image of FIG. 13. Additional information of $\log_2(512!)$ bits is embedded in the coded image of FIG. 14. As is apparent from FIG. 14, as described above, the embedded coding has a function of image encryption.

FIG. 15 shows a decoded image produced by decoding the result (see FIG. 14) of the embedded coding operation by a decoding operation. A comparison between FIGS. 13 and 15 shows that the original image is restored without any deterioration in image quality. If an embedded image is correctly decoded into the original image by a decoding process, additional information can also be restored correctly based on a manner of rearrangement of the columns of the embedded image in the decoding.

Figure 16:
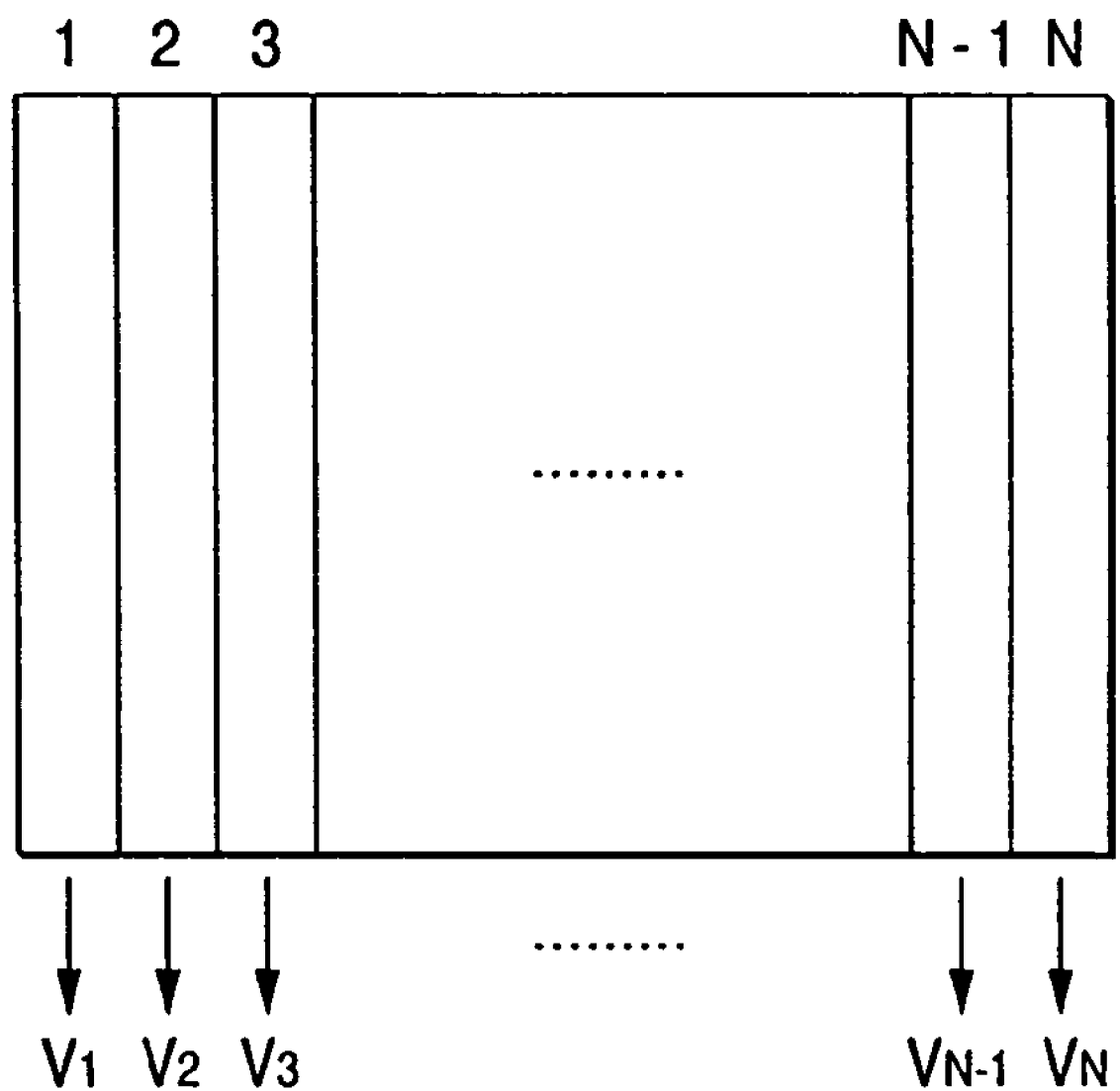
FIG. 16 shows column vectors as an object of swapping according to the flowchart of FIG. 12.

In the above example, the embedded encoder 3 performs embedded coding on, for example, a coding object image consisting of N columns as shown in FIG. 16 by fixing the first column and rearranging the second to Nth columns according to additional information. The decoder 6 decodes a result of embedded coding into the original image and the additional information by utilizing the correlation of the image. It is possible for the decoder 6 to decode a result of embedded coding by utilizing continuity (described below) in addition to the correlation of the image.

That is, in the case of FIG. 12, the reciprocal of the distance between column vectors $v_n$ each having, as elements, the pixel values of the constituent pixels of the corresponding column of the image of FIG. 16 is defined as correlation and coded data is decoded by using only the correlation thus defined. In the decoder 6, first, the column corresponding to the column vector having the smallest distance from the column vector of the fixed first column is made the second column. Then, in the decoder 6, the column corresponding to the column vector having the smallest distance from the column vector of the second column is made the third column. Similar operations are repeated from the next step onward, whereby the original image is restored and the embedded additional information is restored based on how the second to Nth columns were rearranged.

Figure 17:
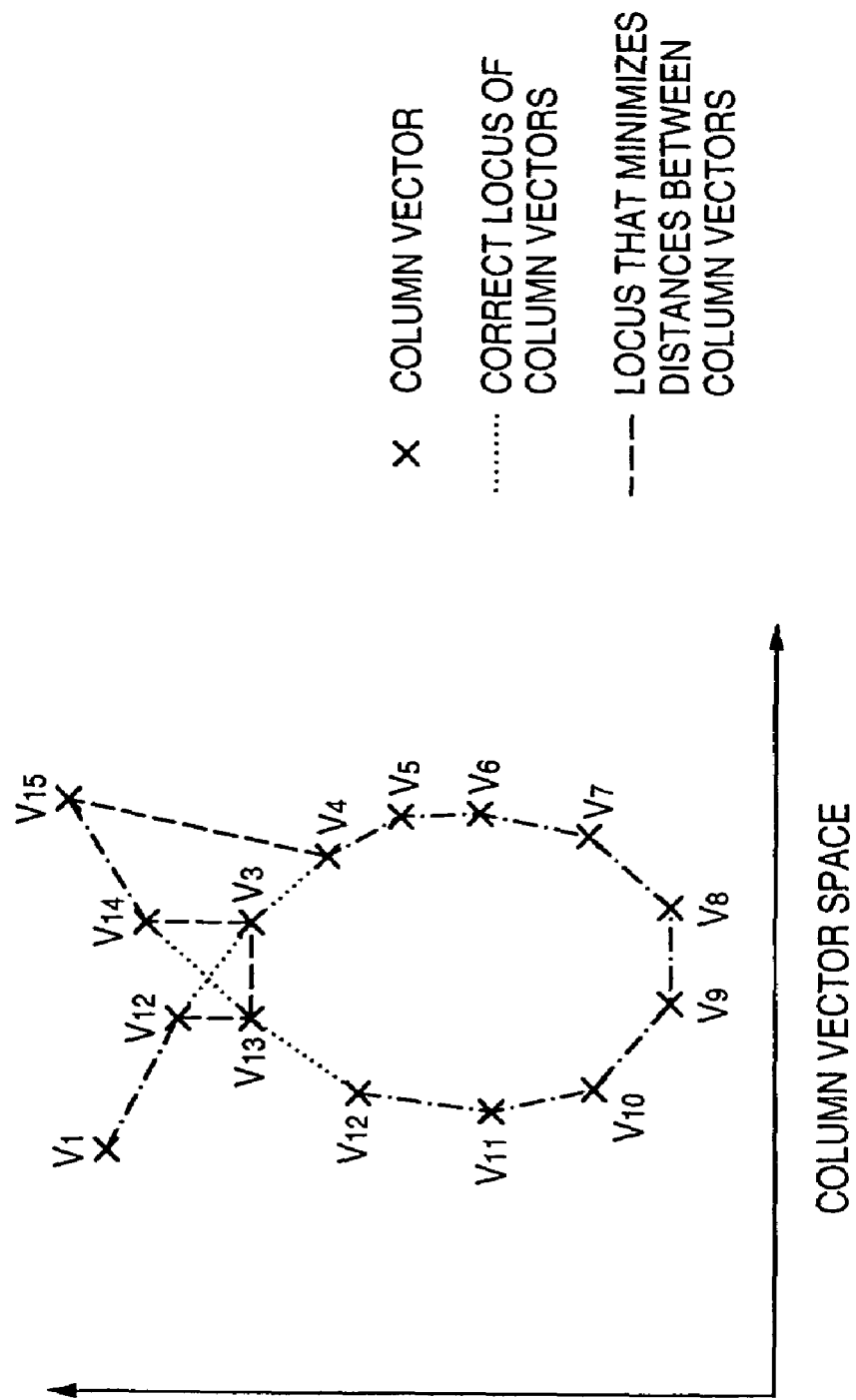
FIG. 17 is a first explanatory diagram of column vectors in the column vector space.

Now assume that the locus, in the column vector space, of column vectors $v_1, v_2, \ldots, v_n$ of the N columns of the image of FIG. 16 is, for example, one that is indicated by a thin broken line in FIG. 17.

If in the swapping section 46 the column vectors having the smallest distances are detected in order starting from the state that the subject column is the first column in the manner described above, a locus indicated by a thick broken line in FIG. 17 is drawn. That is, column vectors are detected in order of $v_1, v_2, v_{13}, v_3, v_{14}, v_{15}, v_4, v_{5, 6}, \ldots$. Therefore, in the swapping section 46, column vectors are not detected in correct order when only the correlation (in this case, the distance between column vectors) is used, and, as a result, neither the image nor the additional information can be restored correctly.

Figure 18:
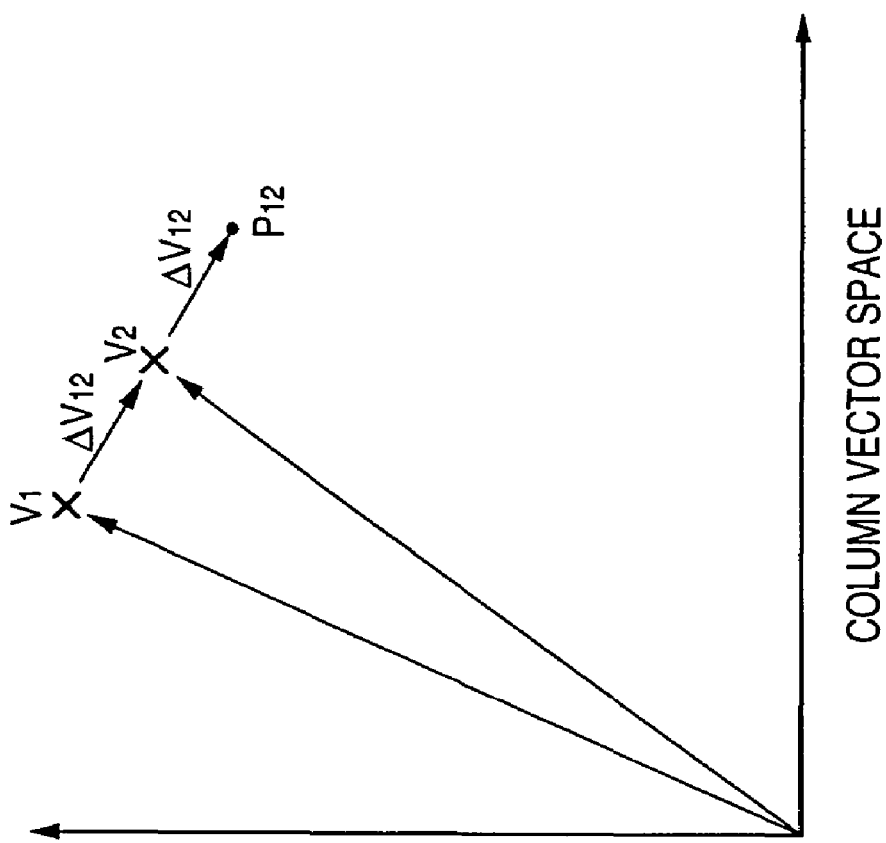
FIG. 18 is a second explanatory diagram of column vectors in the column vector space.

To solve this problem, for example, in the swapping section 46, after the column corresponding to the column vector having the smallest distance from the column vector $v_1$ of the first column is made the second column, a difference vector $\Delta v_{12}$ between the column vector $v_2$ of the second column and the column vector $v_1$ of the first column is calculated as shown in FIG. 18. Then, in the swapping section 46, the column corresponding to the column vector closest to point $P_{12}$ that is represented by a vector obtained by adding the difference vector $\Delta v_{12}$ to the column vector $v_2$ is made the third column.

Further, in the swapping section 46, a difference vector between the column vector $v_3$ of the third column and the column vector $v_2$ of the second column is calculated and the column corresponding to the column vector closest to a point that is represented by a vector obtained by adding the difference vector to the column vector $v_3$ is made the fourth column. From the next step onward, the remaining columns to the Nth column are determined in similar manners.

By utilizing, as described above, in the swapping section 46, not only the correlation between the nth column and the (n+1)th column but also the continuity between the column vector $v_n$ of the nth column and the column vector $v_{n+1}$ of the (n+1)th column, that is, in this case, the fact that the variation of the difference vector $v_{n+1}-v_n$ is continuous, the column vectors are detected in such correct order that a locus is drawn in the manner as indicated by the thin broken line in FIG. 17 and the image and the additional information are restored correctly.

In the embodiment of FIG. 9, the pixels of the coding object image except the pixels of the first column are rearranged on a column-by-column basis based on the additional information, whereby embedding of the additional information into the image, that is, the embedded coding, is performed. The embedded coding can be performed in other ways. For example, the pixels of a coding object image may be rearranged on a row-by-row basis, or the position of a sequence of pixels, located at the same position, of a prescribed number of frames arranged in time may be moved.

Another example of the embedded coding is such that the pixels of a coding object image are rearranged on a column-by-column basis and the pixels of a resulting image are further rearranged on a row-by-row basis.

For example, the columns of an image consisting of M (vertical)×N (horizontal) pixels as shown in FIG. 19 are rearranged based on additional information by the embedded encoder 3 to produce an embedded image as shown in FIG. 20A. In FIG. 20A, the first column of the image of FIG. 19 is moved to the fifth column, the second column to the Nth column, the third column to the first column, the fourth column to the second column, the fifth column to the fourth column, the sixth column to the third column, . . . , the Nth column to the sixth column.

For example, the rows of the image of FIG. 20A are rearranged based on additional information by the embedded encoder 3 to produce an embedded image as shown in FIG. 20B. In FIG. 20B, the first row of the image of FIG. 20A is moved to the third row, the second row to the fifth row, the third row to the second row, the fourth row to the Mth row, the fifth row to the first row, . . . , the Mth row to the fourth row.

If a column that has not been moved exists, for example, immediately on the left of the first column, the embedded image of FIG. 20B is decoded into the original image of FIG. 19 by the decoder 6's executing the decoding process described above with reference to FIG. 12 by using that column as the new first column. That is, in the embedded image-produced by the rearrangement in both of the column and row directions, the terms themselves to be added together in the summation $\Sigma$ of Equation (1) are not changed though their order is changed. Therefore, the distance $d(n, k)$ that is calculated by Equation (1) remains the same in the case where only the columns have been rearranged and in the case where both of the columns and the rows have been rearranged as long as the image that has been subjected to the embedded coding is the same. The embedded image produced by rearranging both of the columns and the rows is also decoded into the original image and the additional information by the decoding process of FIG. 12 in the same manner as the embedded image produced by rearranging only the columns is done.

It is understood from the above discussion that when the embedded encoder 3 rearranges both of the columns and rows, which of the columns and the rows are rearranged first does not influence a decoding operation. Therefore, the embedded encoder 3 may first rearrange either the columns or the rows and the decoder 6 may first rearrange either the columns or the rows. It is even possible for each of the encoder 3 and the decoder 6 to alternately employ the columns and the rows as the item to be rearranged first.

Where the embedded encoder 3 rearranges only the columns in an embedded coding operation, a manner of rearrangement of the columns of an embedded image when the decoder 6 decodes the embedded image into the original image becomes a decoding result of the additional information. Where the embedded encoder 3 rearranges both of the rows and the columns, to what position (m', n') of a decoded image the pixel at an mth-row, nth-column position (m, n), for example, of an embedded image is moved becomes a decoding result of the additional information.

In the embedded coding process of FIG. 8 only the first column of a coding object image is fixed, and the decoder 6 rearranges the other columns of an embedded image by using the first column as, so to speak, a reference of decoding. The reference of decoding is not limited to the first column, and may be the last, Nth column or any other column as long as it is set in the embedded encoder 3 and the decoder 6. Further, the reference of decoding need not always be the pixels of one column and may be, in an extreme case, one pixel.

Where the embedded encoder 3 uses, for example, the first column as a reference of decoding and rearranges the other columns of an embedded image by utilizing the correlation of the image, if one column is erroneously moved, the possibility is high that an erroneous column is moved to the next column (in this embodiment, the column immediately on the right of the erroneously moved column). In this case, the decoder 6 cannot restore the original image and hence cannot restore the correct additional information.

In the embedded coding process, it is possible to leave a plurality of columns as references of decoding, that is, to exclude those columns from an object of rearrangement.

For example, where the embedded encoder 3 performs rearrangement by using a set of pixels of an image arranged in the column direction as a unit of rearrangement, it is possible for the embedded encoder 3 to make every other column (hatched in FIG. 21) a reference of decoding and make the remaining columns (i.e., the columns indicated by blanks in FIG. 21) an object of rearrangement.

Figure 21:
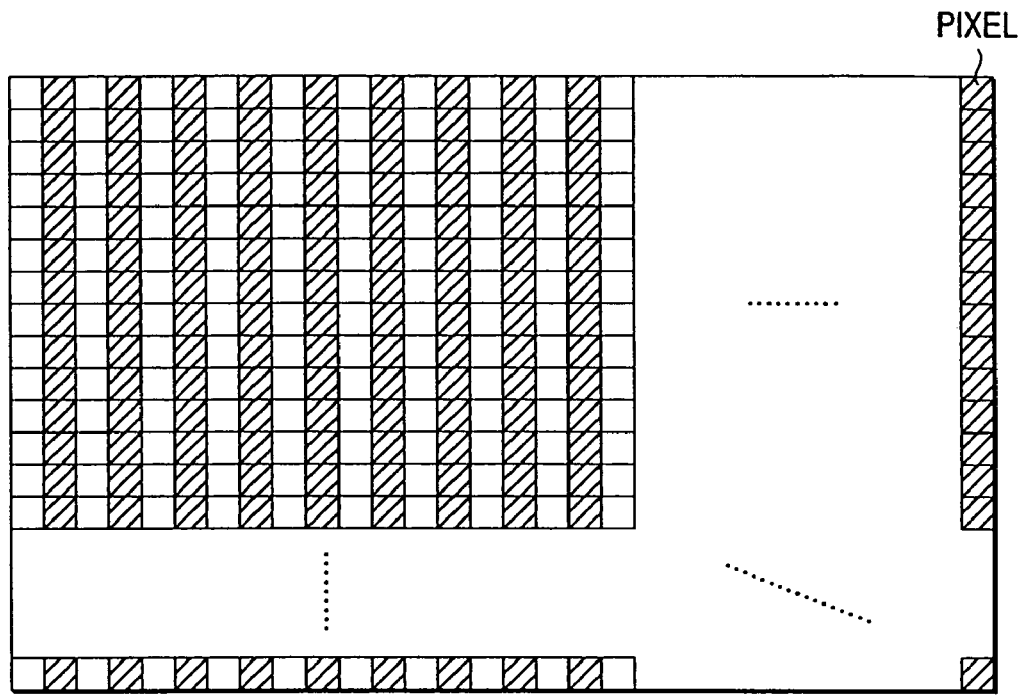
FIG. 21 is a first chart showing sets of pixels as references of decoding.

In the case of FIG. 21, if the image has 2N columns, the data amount of additional information that can be embedded by the embedded encoder 3 amounts to $\log_2(N!)$ bits.

It is possible for the embedded encoder 3 to use a unit of rearrangement that is smaller than a column or a row, that is, a set of one or more pixels.

Figure 22:
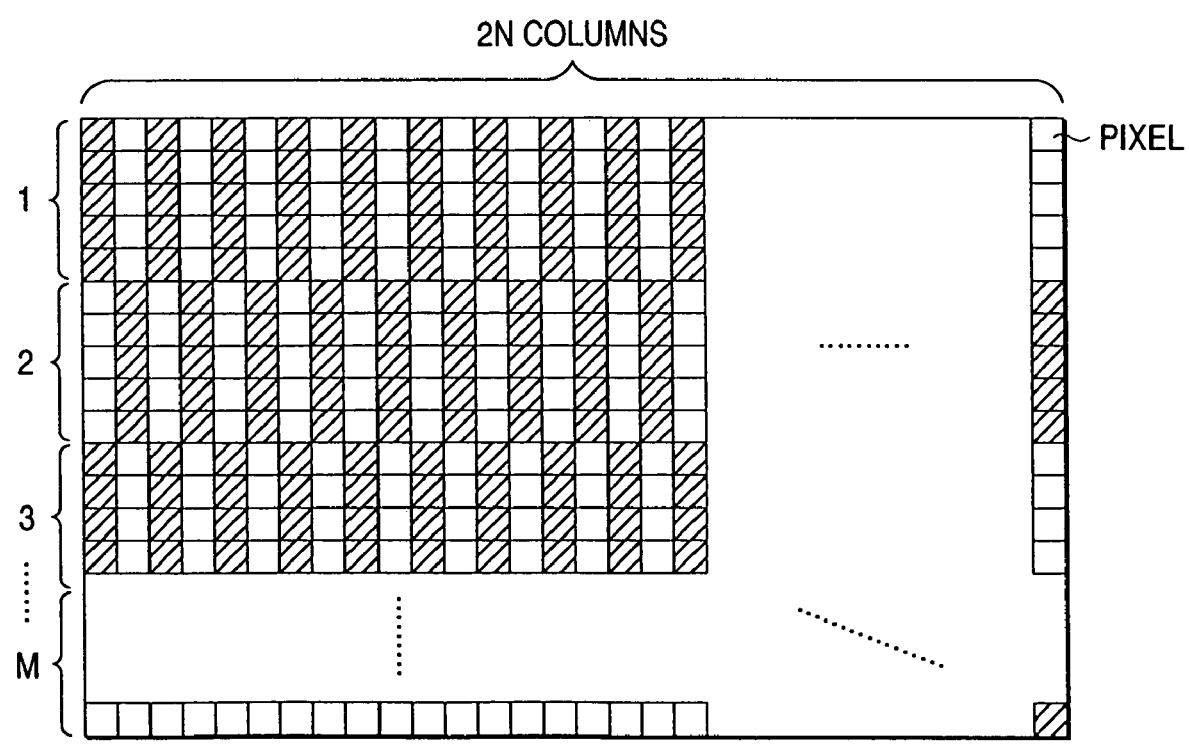
FIG. 22 is a second chart showing sets of pixels as references of decoding.

For example, as shown in FIG. 22, the embedded encoder 3 can perform rearrangement by dividing each column of an image into sets of one or more (e.g., five) consecutive pixels and using such a set as a unit of rearrangement. As shown in FIG. 22, the embedded encoder 3 can classify the units of rearrangement into two categories in checkered pattern and can make one category (e.g., the portions indicated by blanks in FIG. 22) an object of rearrangement and make the other (hatched in FIG. 22) references of decoding. In this case, if the number of rows, that is, the number of pixels in the column direction, of the image is such as to accommodate M units of rearrangement and the image has 2N columns, the data amount of additional information that can be embedded by the embedded encoder 3 amounts to $\log_2\{(M \times N)!\}$ bits.

Figure 23:
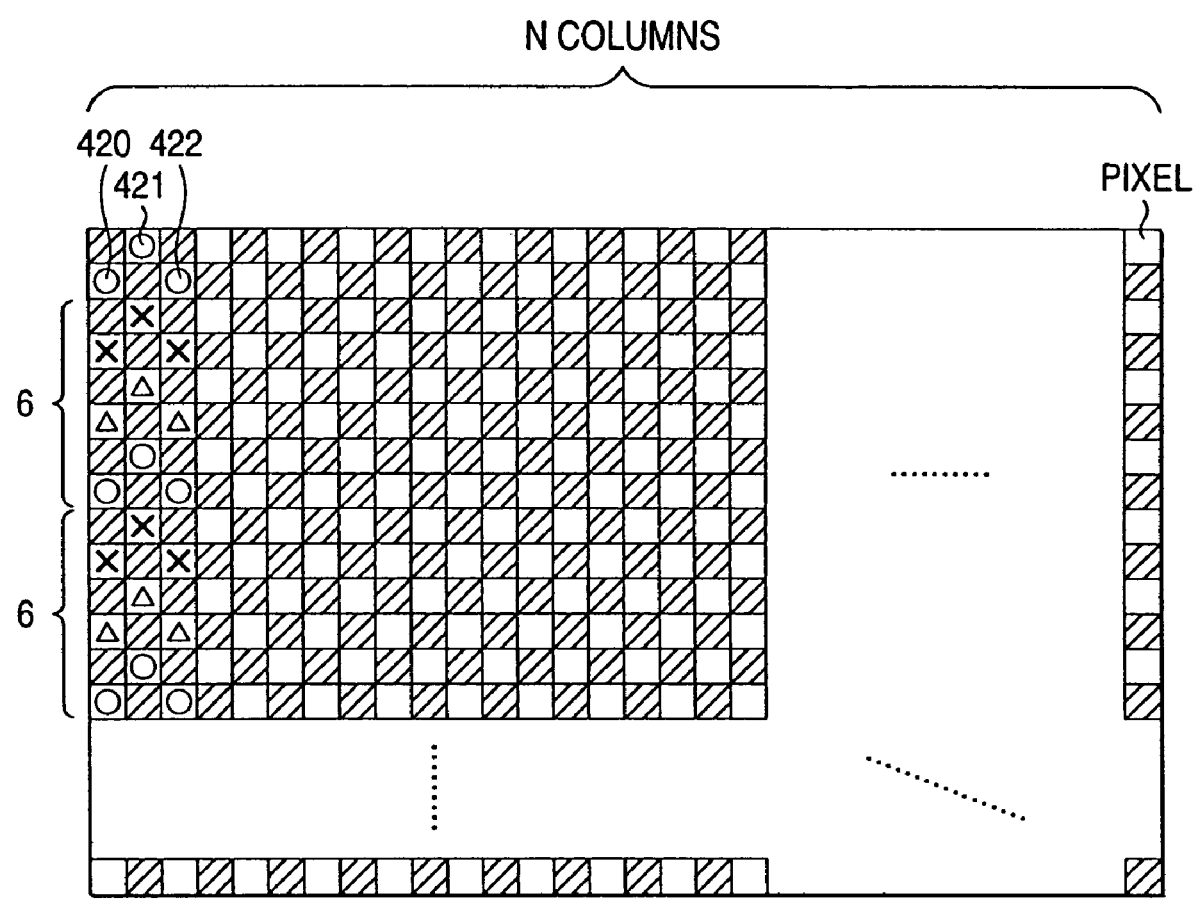
FIG. 23 is a third chart showing sets of pixels as references of decoding.

For example, as shown in FIG. 23, the embedded encoder 3 can extract pixels of each column of an image that are distant from each other by a prescribed number of pixels (e.g., six pixels) and perform rearrangement by using a set of extracted pixels (e.g., pixels indicated by "o" in FIG. 23, pixels indicated by "x", or pixels indicated by "Δ") as a unit of rearrangement. As shown in FIG. 23, the embedded encoder 3 can classify the pixels constituting the image into two categories in checkered pattern and can make one category (e.g., the portions indicated by blanks in FIG. 23) an object of rearrangement and make the other (hatched in FIG. 23) references of decoding. In this case, if a set of pixels obtained by extracting pixels of each column of the image that are distant from each other by 2M pixels (six pixels in FIG. 23) is used as a unit of rearrangement and the image has N columns, the data amount of additional information that can be embedded into the image amounts to $\log_2\{(M \times N)!\}$ bits. The data amount amounts to $\log_2\{(M \times N)\}$ because the embedded encoder 3 can perform embedding on a column-by-column basis as indicated by, for example, reference numerals 421 and 422 by using the sets indicated by "o" as units of rearrangement.

In the examples of FIGS. 21 to 23, each set of pixels as an object of rearrangement (i.e., the pixels indicated by blanks in FIGS. 21 to 23) is adjacent to a plurality of references of decoding (i.e., hatched portions in FIGS. 21 to 23). In this case, for example, the decoder 6 performs decoding by using, as correlation, the reciprocal of the sum of the squares of the distances between a set of pixels as an object of rearrangement and the plurality of references of decoding.

As described above, no particular limitations are imposed on the unit of rearrangement used in the embedded coding and the decoding.

Further, no particular limitations are imposed on the set of pixels as a reference of decoding.

From the viewpoint of the correctness of decoding, it is preferable that a pixel as an object of rearrangement be adjacent to as many pixels as references of decoding as possible. Therefore, the example of FIG. 23 is most desirable. From the viewpoint of the correctness of decoding, it is preferable that there are as many pixels as references of decoding as possible.

However, since pixels as references of decoding are not made an object of rearrangement, the data amount of additional information that can be embedded into an image by the embedded encoder 3 decreases as the number of pixels as references of decoding increases. The encryption effect of the embedded coding operation of the invention is less remarkable when there are many pixels as references of decoding or a pixel as an object of rearrangement is adjacent to many pixels as references of decoding.

It is desirable that the number of pixels as references of decoding and their arrangement pattern be set in accordance with the purpose of the embedded coding and the decoding in consideration of the correctness of decoding, the data amount of additional information to be embedded, and the encryption effect.

The encryption effect is also weakened if a certain column is moved to a nearby column or columns that are close to each other are moved while keeping their positional relationship; it is necessary to avoid such rearrangement. In the embedded coding operation of the embedded encoder 3, it is possible to impose limitations that each column should be moved to a column that is distant from that column by more than a prescribed distance and that columns that are close to each other should be moved to columns that are distant from those columns by more than a prescribed distance.

Where an image as an object of embedded coding is a color image that consists of, for example, RGB component signals, the embedded encoder 3 may move the corresponding columns of the RGB components to the same position or rearrange the columns of the RGB components independently of each other. Where the embedded encoder 3 moves the corresponding columns of the RGB components to the same position, the data amount of additional information that can be embedded is smaller but the decoding accuracy in the decoding is made higher than in the case where the embedded encoder 3 moves the columns of the RGB components independently of each other. Conversely, where the embedded encoder 3 moves the columns of the RGB components independently of each other, the decoding accuracy in the decoding is made lower but the data amount of additional information that can be embedded is larger than in the case where the embedded encoder 3 moves the corresponding columns of the RGB components to the same position.

There are no particular limitations on the type of additional information. For example, an image, a voice, a text, a computer program, a control signal, and other kinds of data may be used as additional information. Where part of an image stored in the image database 1 is made additional information and the remaining part is made a coding object that is supplied to the frame memory 31, the former part of the image as the additional information is embedded into the latter part, which means realization of image compression.

Although the embodiment of the invention is directed to an image, the invention may be implemented in such a manner that data sequences of a prescribed time of a voice are rearranged.

Although in the embodiment the embedded coding operation or the decoding operation is performed by executing a computer program under the control of the CPU 32 or 42, it may be performed by dedicated hardware.

Although in the embodiment a computer program to be executed under the control of the CPU 32 or 42 is stored in the program memory 33 or 43, the computer program may be provided as a signal via a recording medium such as a semiconductor memory, a magnetic tape, a magnetic disk, an optical disc, a magneto-optical disc, or a phase change disc or a transmission medium such as the Internet, ground waves, a satellite channel, a public network, or a CATV (cable television) network.

Figure 24A:
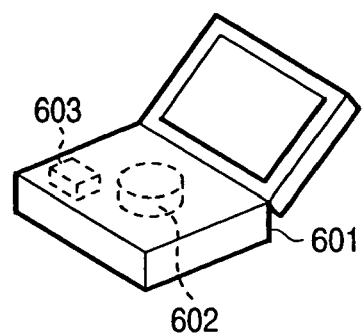
FIG. 24A shows a computer in which a program for causing execution of a process relating to the invention is to be installed.
Figure 24B:
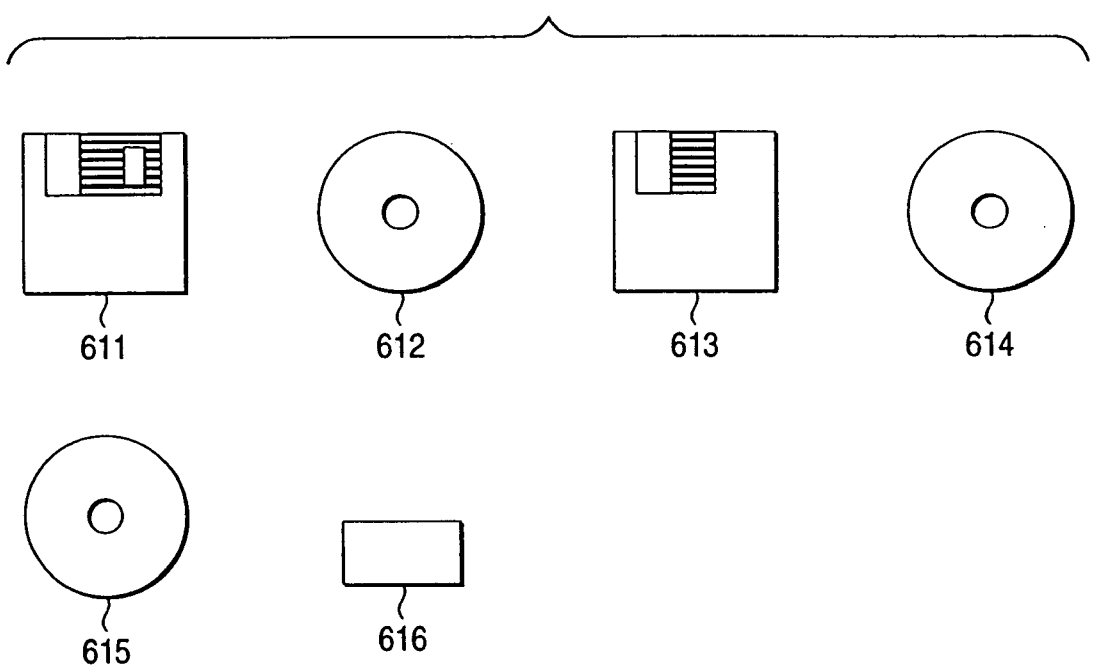
FIG. 24B shows example storage media on which a program for causing execution of a process relating to the invention is to be stored.
Figure 24C:
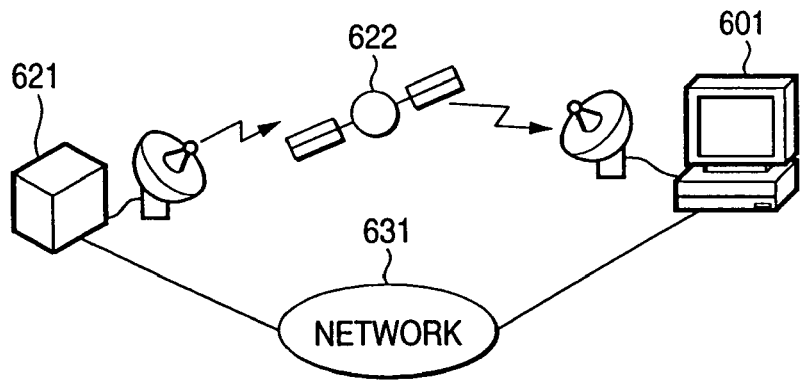
FIG. 24C is a conceptual diagram showing how a program for causing execution of a process relating to the invention is distributed to a computer via a satellite or a network.

Referring to FIGS. 24A to 24C, a description will be made of a recording medium on which a computer program is recorded and a signal that is supplied to a computer via a transmission medium that are used to establish a state that the above computer program is installed in a computer and rendered executable by the computer.

As shown in FIG. 24A, a program is recorded in advance on a hard disk 602 or a semiconductor memory 603 as a recording medium that is incorporated in a computer 601.

Alternatively, as shown in FIG. 24B, a program is recorded temporarily or permanently on a recording medium such as a floppy disk 611, a CD-ROM (compact disc read-only memory) 612, an MO (magneto-optical) disc 613, a DVD (digital versatile disc) 614, a magnetic disk 615, or a semiconductor memory 616.

In addition to a method that a program is installed in a computer from any of the above recording media, as shown in FIG. 24C, it is possible to transfer a program wirelessly from a download site 621 to the computer 601 via an artificial satellite 622 for digital satellite broadcast or transfer a program by wire from the download site 621 to the computer 601 via a network 631 such as a LAN (local area network) or the Internet, and install it in the computer 601 so that it is stored in, for example, the hard disk 102 incorporated in the computer 601.

The steps described by a program for execution of each of various processes of the invention need not always be executed in a time-series manner in order as described in a flowchart, and the invention includes a process in which the steps are executed in parallel or individually (e.g., a parallel process and an object process).

Figure 25:
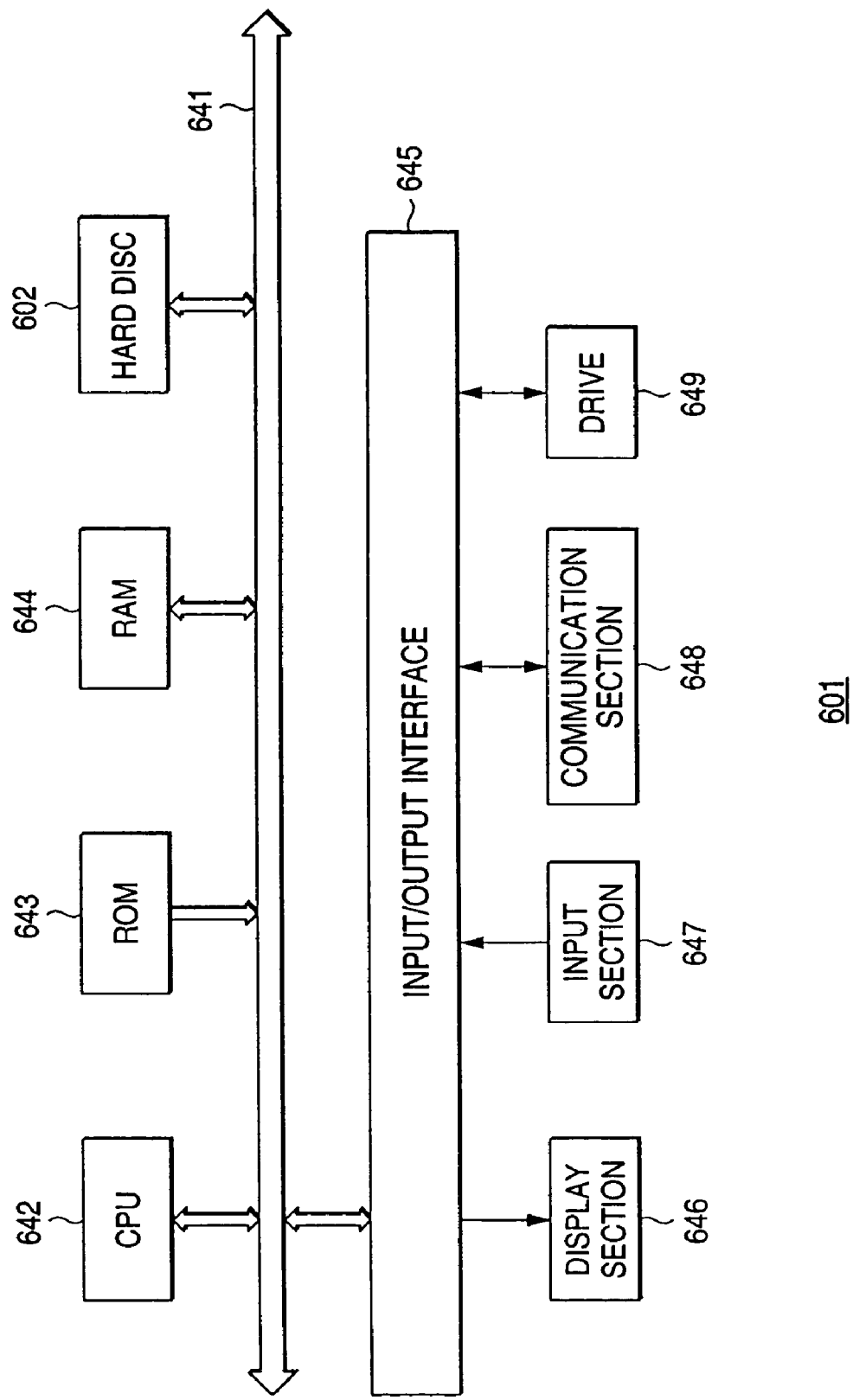
FIG. 25 is a block diagram showing an example computer in which a program for causing execution of a process relating to the invention is to be installed.

FIG. 25 shows an example configuration of the computer 601 shown in FIGS. 24A and 24C.

As shown in FIG. 25, the computer 601 incorporates a CPU (central processing unit) 642. An input/output interface 645 is connected to the CPU 642 via a bus 641. When receiving, via the input/output interface 645, a command that has been produced by the user's manipulating an input section 647 such as a keyboard or a mouse, the CPU 642 executes a program that is stored in a ROM (read-only memory) 643 corresponding to the semiconductor memory 603 shown in FIG. 24A in accordance with the command. The flowchart shown in FIG. 8 or 12 is executed as this program. Alternatively, the CPU 642 loads, into a RAM (random access memory) 644, a program that is stored in the hard disk 602, a program transferred via the satellite 622 or the network 631, received by a communication section 648, and installed in the hard disk 602, or a program read out from the floppy disk 611, the CD-ROM 612, the MO disc 613, the DVD 614, the magnetic disk 615, or the semiconductor memory 616 that is mounted in a drive 649 and installed in the hard disk 602, and executes the program. For example, the CPU 641 outputs a processing result to a display section 646 such as an LCD (liquid crystal display) via the input/output interface 645, when necessary.

What is claimed is:

1. A coding apparatus, comprising:
a storage medium configured to store original first data; and
a coder configured to embed second data into the original first data by rearranging the original first data according to the second data, to produce coded data;
wherein the coder detennines, based on the second data, a portion of the first data that is replaced by the second data, and
wherein the original first data and the second data can be reproduced by decoding the coded data.

2. The coding apparatus according to claim 1, further comprising an input unit configured to allow input of the first data and the second data.

3. The coding apparatus according to claim 1, wherein:
the first data is image data consisting of a plurality of pixel data;
the storage medium stores the image data; and
the coder embeds the second data into the image data by rearranging, according to the second data, positions of sets of one or more pixel data constituting the image data that is stored in the storage medium.

4. The coding apparatus according to claim 3, wherein the coder rearranges, according to the second data, the positions of the sets of one or more pixel data in a frame of the image data.

5. The coding apparatus according to claim 3, wherein the coder rearranges, according to the second data, the positions of the sets of pixel data constituting the image data, each of the sets of pixel data constituting one column or one row.

6. The coding apparatus according to claim 3, wherein the coder rearranges the positions of the sets of one or more pixel data constituting the image data according to numbers of pixels corresponding to values of the second data.

7. The coding apparatus according to claim 1, wherein part of the first data is prohibited from being subjected to the data rearrangement by the coder.

* * * * *